United States Patent
Aizawa

(10) Patent No.: US 10,899,148 B2
(45) Date of Patent: Jan. 26, 2021

(54) PRINTER AND PRINTER DISPLAY DEVICE

(71) Applicant: Seiko Instruments Inc., Chiba (JP)

(72) Inventor: Kazuyuki Aizawa, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 16/697,758

(22) Filed: Nov. 27, 2019

(65) Prior Publication Data

US 2020/0180331 A1 Jun. 11, 2020

(30) Foreign Application Priority Data

Dec. 11, 2018 (JP) .................................. 2018-231684

(51) Int. Cl.
*B41J 15/04* (2006.01)
*B41J 29/13* (2006.01)
(Continued)

(52) U.S. Cl.
CPC ............. *B41J 15/042* (2013.01); *B41J 29/13* (2013.01); *G07G 5/00* (2013.01); *G09G 5/003* (2013.01)

(58) Field of Classification Search
CPC ... B41J 3/46; B41J 15/042; B41J 29/02; B41J 29/13; F16M 11/041; F16M 11/10;
(Continued)

(56) References Cited

U.S. PATENT DOCUMENTS 5,513,922 A * 5/1996 Umbach .................... B41J 3/46
347/222
9,467,539 B2 10/2016 Shiohara
(Continued)

FOREIGN PATENT DOCUMENTS

EP 3075557 A2 10/2016
EP 3075557 A3 1/2017
(Continued)

OTHER PUBLICATIONS

Extended European Search Report in Europe Application No. 19215207.2, dated Mar. 12, 2020, 11 pages.

*Primary Examiner* — Anh T Vo
(74) *Attorney, Agent, or Firm* — Brinks Gilson & Gone

(57) ABSTRACT

A printer includes a printer housing, which includes a plurality of outer surfaces including a bottom surface opposed to an installation surface, and has a recording paper receiving portion configured to receive recording paper through an opening portion; a printer cover, which is coupled to the printer housing, and is configured to openably cover the opening portion; a printer display device, which is removably mounted to the outer surface, of the plurality of outer surfaces, other than the bottom surface, and is configured to display predetermined information; and a connection cable, which is connected between the printer housing and the printer display device, and is configured to communicate at least data related to the predetermined information. The printer display device includes a fixing portion separably mounted to the outer surface; a display portion main body having a display portion configured to display the predetermined information provided thereon; and a hinge portion configured to couple the fixing portion and the display portion main body to each other so that the display portion main body is displaced relative to the fixing portion.

11 Claims, 22 Drawing Sheets

(51) Int. Cl.
*G07G 5/00* (2006.01)
*G09G 5/00* (2006.01)

(58) Field of Classification Search
CPC .. F16M 11/2014; F16M 13/005; F16M 13/02; H04N 1/00546; G07G 5/00; G09G 5/003
See application file for complete search history.

(56) References Cited

U.S. PATENT DOCUMENTS

| | | |
|---|---|---|
| 2008/0016650 A1 | 1/2008 | Moon et al. |
| 2011/0261394 A1 | 10/2011 | Tanaka |
| 2015/0199668 A1* | 7/2015 | Fernando ............. G06Q 20/202 |
| | | 705/14.65 |
| 2015/0309469 A1 | 10/2015 | Kusano et al. |
| 2017/0346968 A1 | 11/2017 | Li |

FOREIGN PATENT DOCUMENTS

| | | |
|---|---|---|
| EP | 3495152 A1 | 6/2019 |
| JP | 2011-042125 A | 3/2011 |
| JP | 2011-230330 A | 11/2011 |
| JP | 2015-150709 A | 8/2015 |

* cited by examiner

PRINTER AND PRINTER DISPLAY DEVICE

RELATED APPLICATIONS

This application claims priority to Japanese Patent Application No. 2018-231684 filed on Dec. 11, 2018, the entire content of which is incorporated herein by reference.

BACKGROUND OF THE INVENTION

1. Field of the Invention

The present invention relates to a printer and a printer display device.

2. Description of the Related Art

As an apparatus for, for example, inputting sales, receiving or paying money, or issuing a receipt in various kinds of stores and the like, a POS system configured to manage a point-of-sale system (POS) has hitherto been adopted. This type of POS system includes, for example, a POS terminal, a printer, a display device such as a liquid crystal display, and peripheral equipment such as a cash drawer.

As the printer forming the POS system, various types have been known. For example, a printer connected to a display device through a connection cable or the like has been known. There has hitherto been known, for example, a printer stand that includes a support portion configured to removably support a printer (thermal printer) on a front surface side and removably support a display device on a back surface side. This printer stand can mainly exhibit two functions: a printer support function of supporting the printer in a posture different from an installation posture (for example, a horizontal posture) of the independent printer; and an advertising function as an advertising medium or the like for displaying various kinds of information through the display device. As another printer, there has also been known, for example, a printer connected to a self-standing display device through a connection cable or the like.

However, in the case of the above-mentioned related-art printer stand, the display device is fixed to the back surface side of the support portion, and hence the angle (viewing angle) at which the display device can be visually recognized is liable to be limited. Therefore, the direction in which the display device is visually recognized is limited in accordance with the posture of the printer stand. As a result, after the printer stand is installed, an orientation of the display device cannot be easily changed, and it is difficult to effectively display various kinds of information. Further, the printer and the display device are supported by the printer stand, and hence it is required to secure installation space of the printer stand itself having a large size in order to install the printer and the display device. Therefore, it is required to secure large installation space, and an installation position is liable to be limited. Thus, there is room for improvement.

Further, the printer is supported on the front surface side of the support portion, and the display device is supported on the back surface side of the support portion. Therefore, it is difficult, for example, for a person who receives printed matter such as a receipt printed by the printer to visually recognize various kinds of information displayed on the display device. Therefore, the related-art printer utilizing the printer stand is not adaptable to such a method of use and is inconvenient. Further, the printer stand configured to support the printer and the display device is required in addition to the printer and the display device, and hence the number of components is increased accordingly, which is liable to cause an increase in cost.

Further, in the case of the related-art printer connected to the self-standing display device, unlike the case of utilizing the above-mentioned printer stand, the display device can be installed separately from the printer. Therefore, visibility can be sufficiently ensured. However, it is required to secure each installation position of the printer and the display device, and hence large installation space is also required. Further, the display device itself may fall down, with the result that there is an increased risk leading to a defect, and the reliability of installation is not sufficient.

In view of the above-mentioned circumstances, in this type of technical field, there has been a demand for a printer and a printer display device in which high visibility can be ensured, and space and cost can be saved.

SUMMARY OF THE INVENTION

According to one embodiment of the present invention, there is provided a printer, including a printer housing, which includes a plurality of outer surfaces including a bottom surface opposed to an installation surface, and has a recording paper receiving portion configured to receive recording paper through an opening portion; a printer cover, which is coupled to the printer housing, and is configured to openably cover the opening portion; a printer display device, which is removably mounted to the outer surface, of the plurality of outer surfaces, other than the bottom surface, and is configured to display predetermined information; and a connection cable, which is connected between the printer housing and the printer display device, and is configured to communicate at least data related to the predetermined information, the printer display device including a fixing portion separably mounted to the outer surface; a display portion main body having a display portion configured to display the predetermined information provided thereon; and a hinge portion configured to couple the fixing portion and the display portion main body to each other so that the display portion main body is displaced relative to the fixing portion.

In the above-mentioned printer according to the one embodiment, wherein the printer housing includes, as the plurality of outer surfaces, at least a front surface and a back surface opposed to each other, wherein the printer cover is provided on the front surface, and wherein the printer display device is separably mounted to the back surface.

In the above-mentioned printer according to the one embodiment, wherein the hinge portion has a rotation axis extending in parallel to each of the installation surface and the outer surface to which the printer display device is mounted, and wherein the display portion main body is coupled to the fixing portion so as to be rotated about the rotation axis through intermediation of the hinge portion.

In the above-mentioned printer according to the one embodiment, wherein the printer housing further includes, as the plurality of outer surfaces, a top surface opposed to the bottom surface, and wherein the display portion main body is configured to be displaced by rotation about the rotation axis between a first position at which the display portion main body is overlapped with the fixing portion and a second position at which the display portion is positioned above the top surface.

In the above-mentioned printer according to the one embodiment, wherein the display portion main body is configured to be rotated within a rotation angle range of 180° about the rotation axis from the first position, and wherein the second position is set to be a position at which the display portion main body is rotated by 1350 or more about the rotation axis from the first position.

In the above-mentioned printer according to the one embodiment, wherein the fixing portion includes a first base portion separably mounted to the outer surface; a second base portion having the display portion main body coupled thereto through intermediation of the hinge portion; and a coupling member configured to couple the first base portion and the second base portion to each other so that the second base portion is displaced relative to the first base portion through intermediation of at least one auxiliary hinge portion.

According to one embodiment of the present invention, there is provided a printer display device which is separably mounted to a printer, and has at least data related to predetermined information communicated thereto through a connection cable connected between a printer housing and the printer display device, the printer including the printer housing, which includes a plurality of outer surfaces including a bottom surface opposed to an installation surface, and has a recording paper receiving portion configured to receive recording paper through an opening portion; and a printer cover, which is coupled to the printer housing, and is configured to openably cover the opening portion, the printer display device including a fixing portion separably mounted to the outer surface, of the plurality of outer surfaces, other than the bottom surface; a display portion main body having a display portion configured to display the predetermined information provided thereon; and a hinge portion configured to couple the fixing portion and the display portion main body to each other so that the display portion main body is displaced relative to the fixing portion.

DETAILED DESCRIPTION OF THE PREFERRED EMBODIMENTS

First Embodiment

Now, a first embodiment of the present invention is described with reference to the drawings. In the first embodiment, description is given of an example of a thermal printer to be used in a POS system.

Figure 1:
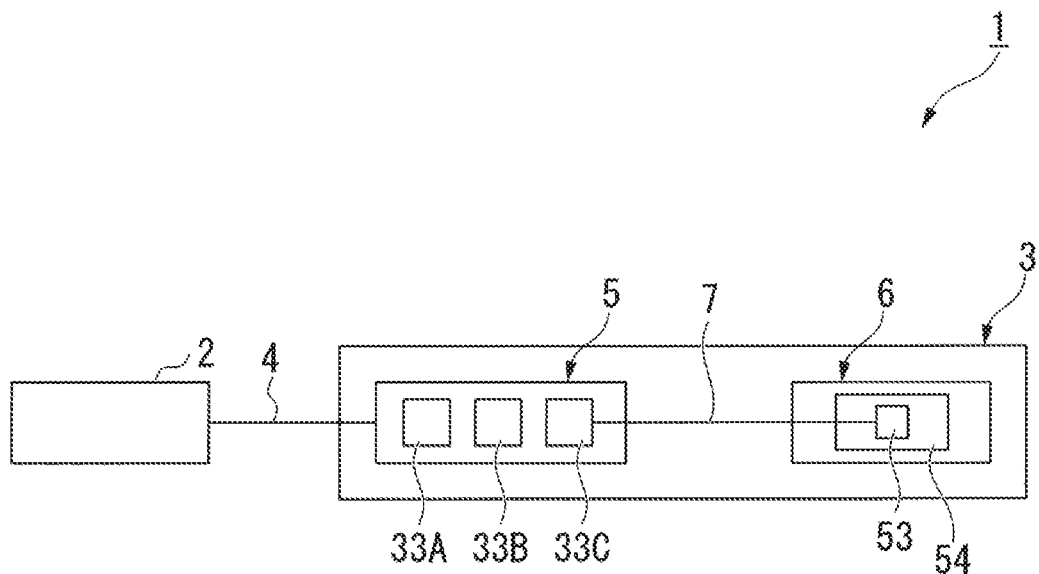
FIG. 1 is a block diagram of a POS system including a thermal printer (printer) according to a first embodiment of the present invention.

As illustrated in FIG. 1, a POS system 1 is a system configured to add up sales results of articles and the like on a single item basis, and mainly includes an information processing device 2 and a thermal printer 3. The POS system 1 is installed in various kinds of stores such as a convenience store, a retail store, and a restaurant. In addition, the POS system 1 is configured to display, to customers, various kinds of information including payment information such as names and prices of articles purchased by the customers at a store. The POS system 1 may further include another peripheral equipment as well as the information processing device 2 and the thermal printer 3.

Examples of the information processing device 2 include a desktop type personal computer and a tablet type personal computer, but are not limited thereto. The information processing device 2 and the thermal printer 3 are directly connected to each other through a connection cable 4 such as a universal serial bus (USB) cable (wired connection). However, the mode of connection is not limited thereto. For example, the information processing device 2 and the thermal printer 3 may be connected to each other by wireless connection through radio communication means or the like, or may be connected to each other through a network.

As illustrated in FIG. 1 to FIG. 4, the thermal printer 3 is configured to perform printing on roll-shaped recording paper (heat sensitive paper) P, and the recording paper P can be used as, for example, a ticket or a receipt. The thermal printer 3 mainly includes a printer main body 5, a printer display device 6, and a USB cable (connection cable according to the present invention) 7. The printer main body 5 is configured to print various kinds of information on the recording paper P. The printer display device 6 is configured to display various kinds of information. The USB cable 7 is connected between the printer main body 5 and the printer display device 6, and is configured to communicate at least data related to various kinds of information.

The thermal printer 3 is installed, for example, at a store, and the operation thereof is controlled by the information processing device 2. Therefore, the printer main body 5 is controlled so as to print various kinds of information sent from the information processing device 2 onto the recording paper P and deliver the printed recording paper P. In addition, the printer display device 6 is controlled so as to display various kinds of information sent from the information processing device 2.

Figure 2:
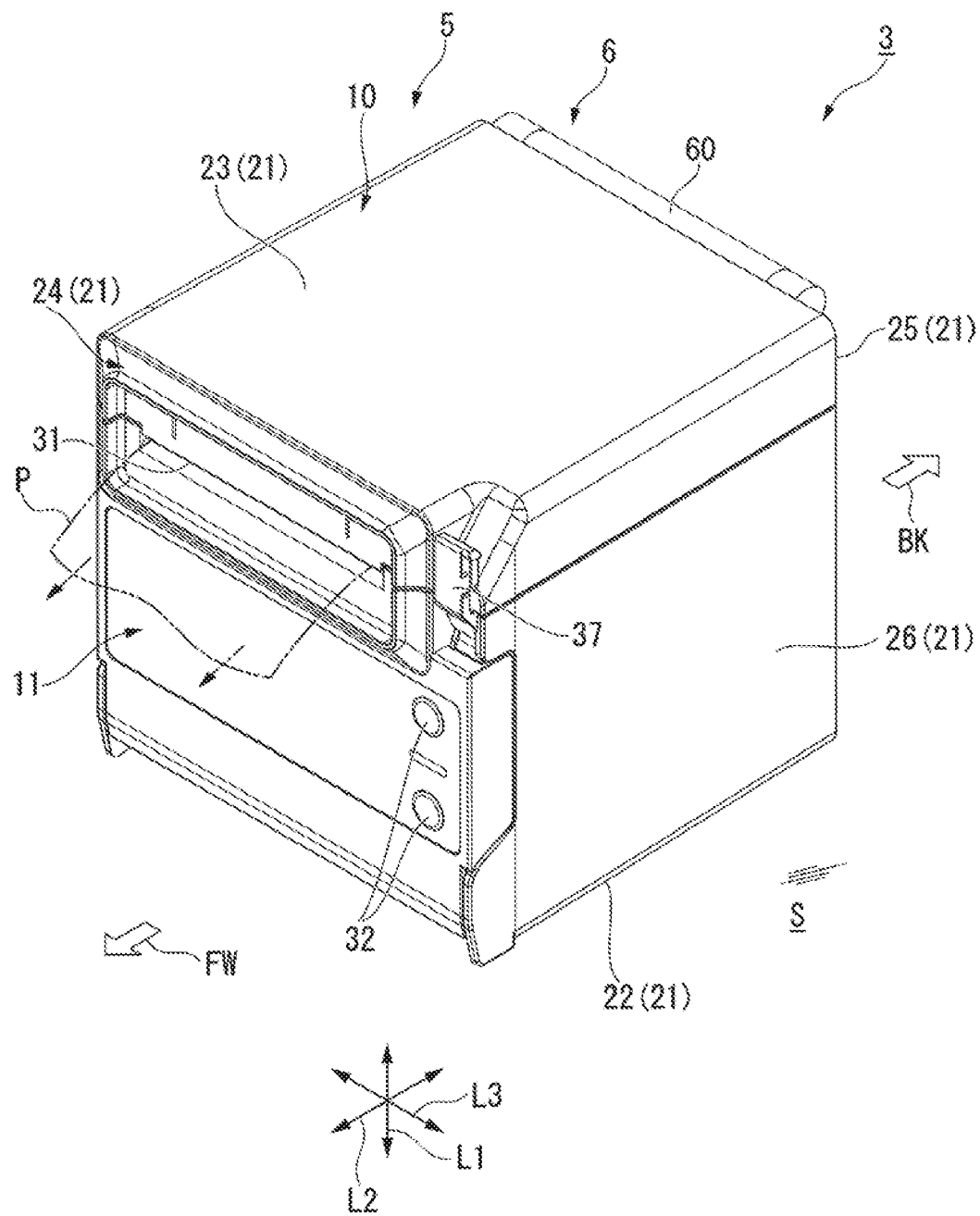
FIG. 2 is a perspective view of the thermal printer illustrated in FIG. 1 when viewed from a front surface side.
Figure 3:
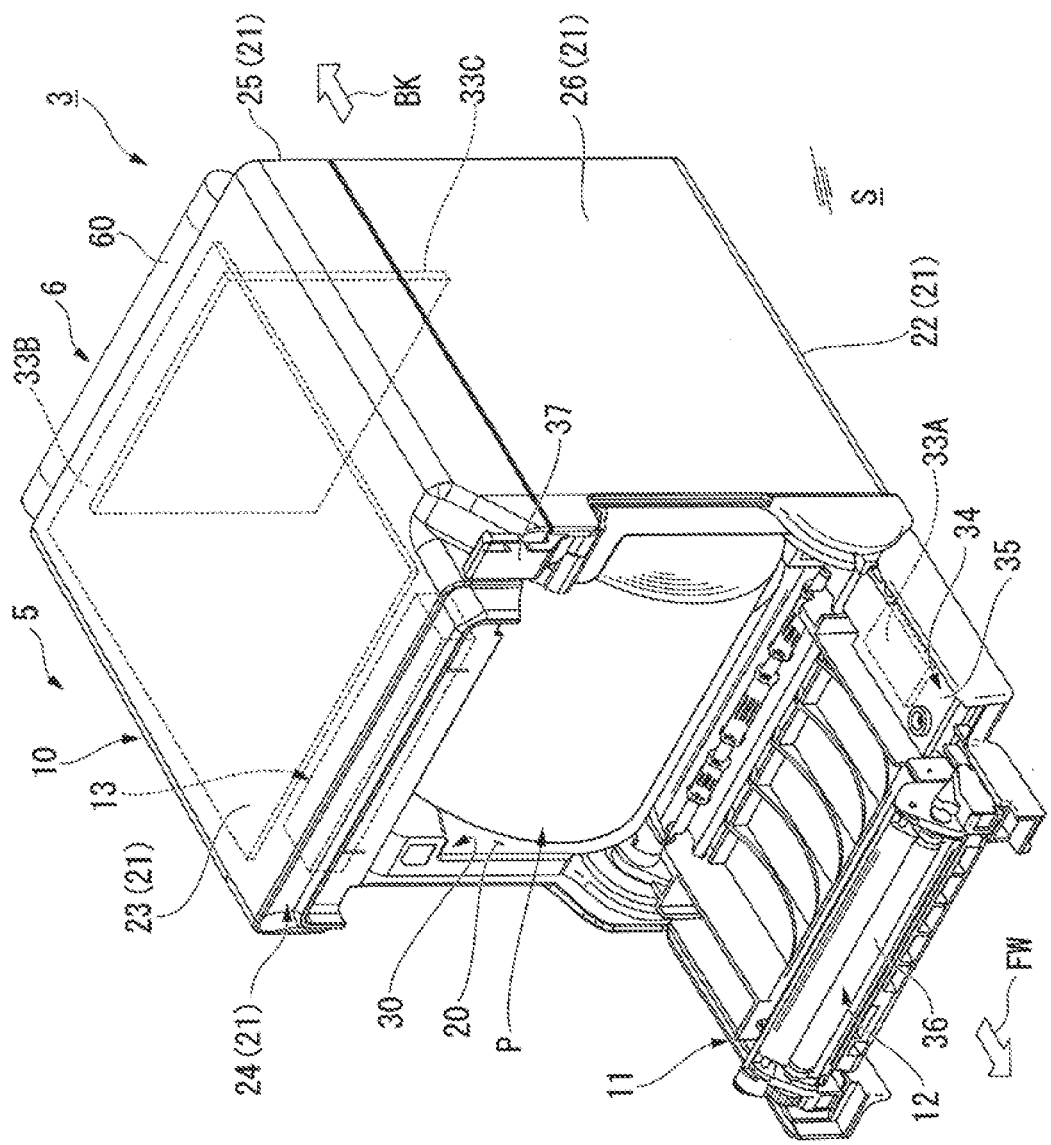
FIG. 3 is a perspective view of the thermal printer in a state in which a printer cover is opened from the state illustrated in FIG. 2.
Figure 4:
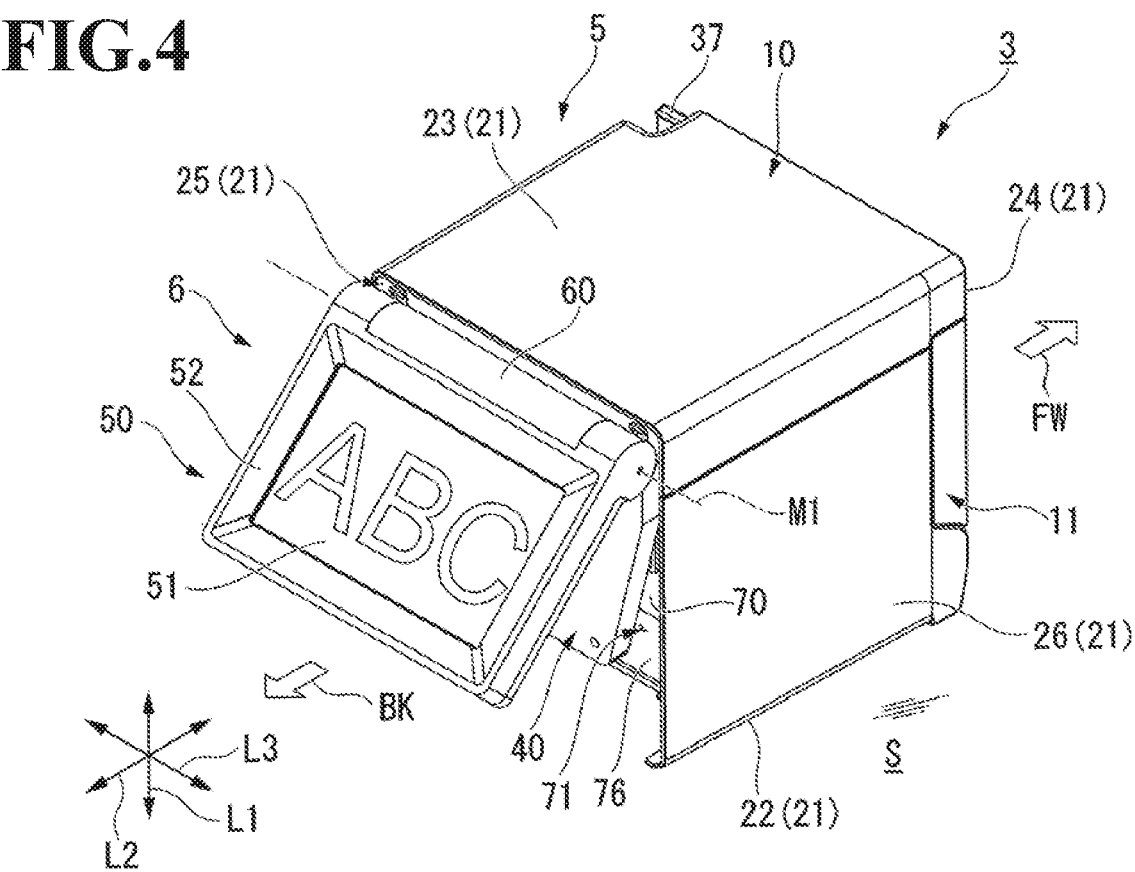
FIG. 4 is a perspective view of the thermal printer illustrated in FIG. 2 when viewed from a back surface side.

As illustrated in FIG. 2 to FIG. 4, the thermal printer 3 is installed on an installation surface S at the store, and has a cubic shape as a whole. In the first embodiment, in a state illustrated in FIG. 2, a direction perpendicular to the installation surface S is referred to as "up-and-down direction L1", and directions orthogonal to each other in a plane parallel to the installation surface S are referred to as "front-and-back direction L2" and "right-and-left direction L3". In the front-and-back direction L2, a front side is indicated by the arrow FW, and a back side is indicated by the arrow BA. Thus, in FIG. 2, a lower left side on the drawing sheet corresponds to the front side, and an upper right side on the drawing sheet corresponds to the back side.

The printer main body 5 includes a casing (printer housing according to the present invention) 10, a printer cover 11, a platen unit 12, and a head unit 13, and is a so-called forward delivery type in which the recording paper P is delivered to the front side.

The casing 10 is formed with a synthetic resin material, a metal material, or an appropriate combination of those materials, has a cubic shape including an opening portion 20 on the front side. The casing 10 has a plurality of outer surfaces 21 including a bottom surface 22 opposed to the installation surface S. Of the plurality of outer surfaces 21, the outer surface 21 opposed to the bottom surface 22 in the up-and-down direction L1 is referred to as "top surface 23". In addition, of the plurality of outer surfaces 21, the outer surface 21 positioned on the front side is referred to as "front surface 24", and the outer surface 21 positioned on the back side is referred to as "back surface 25". The front surface 24 and the back surface 25 are opposed to each other in the front-and-back direction L2. Further, of the plurality of outer surfaces 21, the outer surfaces 21 opposed to each other in the right-and-left direction L3 are referred to as "pair of side surfaces 26".

In the casing 10, there is formed a recording paper receiving portion 30 configured to receive the roll-shaped recording paper P through the opening portion 20 formed in the front surface 24 of the casing 10. Therefore, the recording paper receiving portion 30 is exposed to the front side when the print cover 11 is opened. With this, the roll-shaped recording paper P can be loaded into the recording paper receiving portion 30 from the front side.

The printer cover 11 is coupled to a lower part of the casing 10 on the front surface 24 side through intermediation of a rotary shaft portion (not shown), and is configured to openably cover the opening portion 20. The printer cover 11 is coupled to the lower part of the casing 10 on the front surface 24 side so as to be rotated about the rotary shaft portion within an angle range of about 90°. As illustrated in FIG. 2, when the printer cover 11 is closed, a slight gap is designed to be formed between a distal end of the printer cover 11 and the casing 10. The recording paper P is pulled out to the front side to be delivered from an inside of the casing 10 through the gap. Thus, the gap serves as a delivery slot 31 for the recording paper P.

As illustrated in FIG. 2 and FIG. 3, an operation unit 34 including operation buttons 32 and an auxiliary board 33A is provided to the printer cover 11 having the configuration described above. The operation buttons 32 are, for example, a power button and a sheet feeding button, and are arranged under a state of being exposed to an outer surface of the printer cover 11 so as to be depressed. In the illustrated example, the operation buttons 32 are arranged below a release lever 37 described later so as to be arrayed in a row in the up-and-down direction L1.

The auxiliary board 33A is a board on which a plurality of electronic components (not shown) and switches (for example, a membrane switch) (not shown) that are turned on by pressing the operation buttons 32 are mounted, and is electrically connected to a main board 33B. As illustrated in FIG. 3, the main board 33B is provided on an inner side of the top surface 23 of the casing 10 in the printer main body 5, and is configured to comprehensively control the operation of the thermal printer 3 based on a control signal from the information processing device 2. The auxiliary board 33A is arranged so as to be positioned on an inner surface side of the printer cover 11 and on a back side of the operation buttons 32, and is covered with a protective cover 35 mounted to the inner surface side of the printer cover 11.

Further, the platen unit 12 is mounted on an inner surface on the distal end side of the printer cover 11. The platen unit 12 mainly includes a platen roller 36 configured to feed the recording paper P to the front side. The platen unit 12 is moved in association with an opening and closing operation of the printer cover 11, and can be combined with the head unit 13.

The head unit 13 mainly includes a thermal head (printing head) (not shown), and is mounted in the casing 10. Specifically, the head unit 13 is mounted above the recording paper receiving portion 30 so as to be close to the front surface 24 of the casing 10. The thermal head is formed so as to extend in a width direction of the recording paper P, and is arranged at a position that is opposed to the platen roller 36 when the printer cover 11 is closed. The thermal head includes a plurality of heating elements linearly arrayed along the width direction of the recording paper P, and is biased to the platen roller 36 side. With this, the recording paper P can be held between the platen roller 36 and the head unit 13, and the thermal head can be appropriately pressed against the recording paper P fed by the platen roller 36, with the result that satisfactory printing can be performed.

When the printer cover 11 is closed, the platen unit 12 and the head unit 13 are combined with each other to be integrally coupled to each other. With this, the printer cover 11 is locked in a closed state. Further, in the casing 10, the release lever 37 is provided at a corner part at which the front surface 24, the top surface 23, and one of the pair of side surfaces 26 intersect each other. The release lever 37 is configured to release a locked state of the printer cover 11 to perform an opening operation of the printer cover 11. For example, the release lever 37 can be operated by being depressed downward, and is configured to release the combination between the head unit 13 and the platen unit 12 in association with the depressing operation. With this, the locked state of the printer cover 11 can be released as illustrated in FIG. 3.

As illustrated in FIG. 4 to FIG. 7, the printer display device 6 is removably mounted to the printer main body 5. The printer display device 6 includes a fixing portion 40, a display portion main body 50, and a hinge portion 60. The fixing portion 40 is removably mounted to the back surface 25 of the casing 10 of the printer main body 5. The display portion main body 50 includes a display portion 51 configured to display various kinds of information. The hinge portion 60 is configured to couple the fixing portion 40 and the display portion main body 50 to each other so that the display portion main body 50 can be displaced relative to the fixing portion 40.

Figure 6:
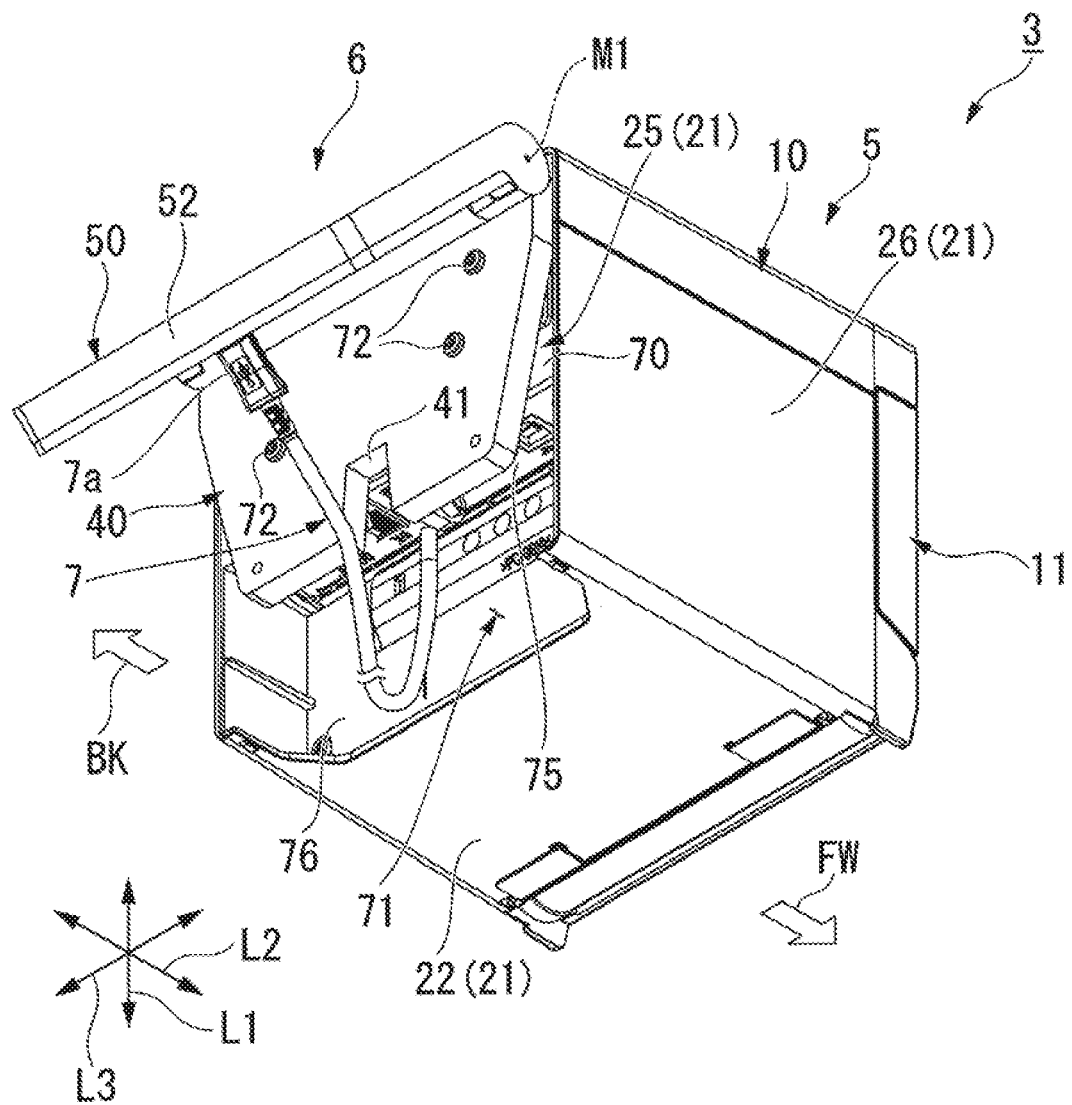
FIG. 6 is a perspective view of the thermal printer illustrated in FIG. 4 when viewed from a bottom surface side.
Figure 7:
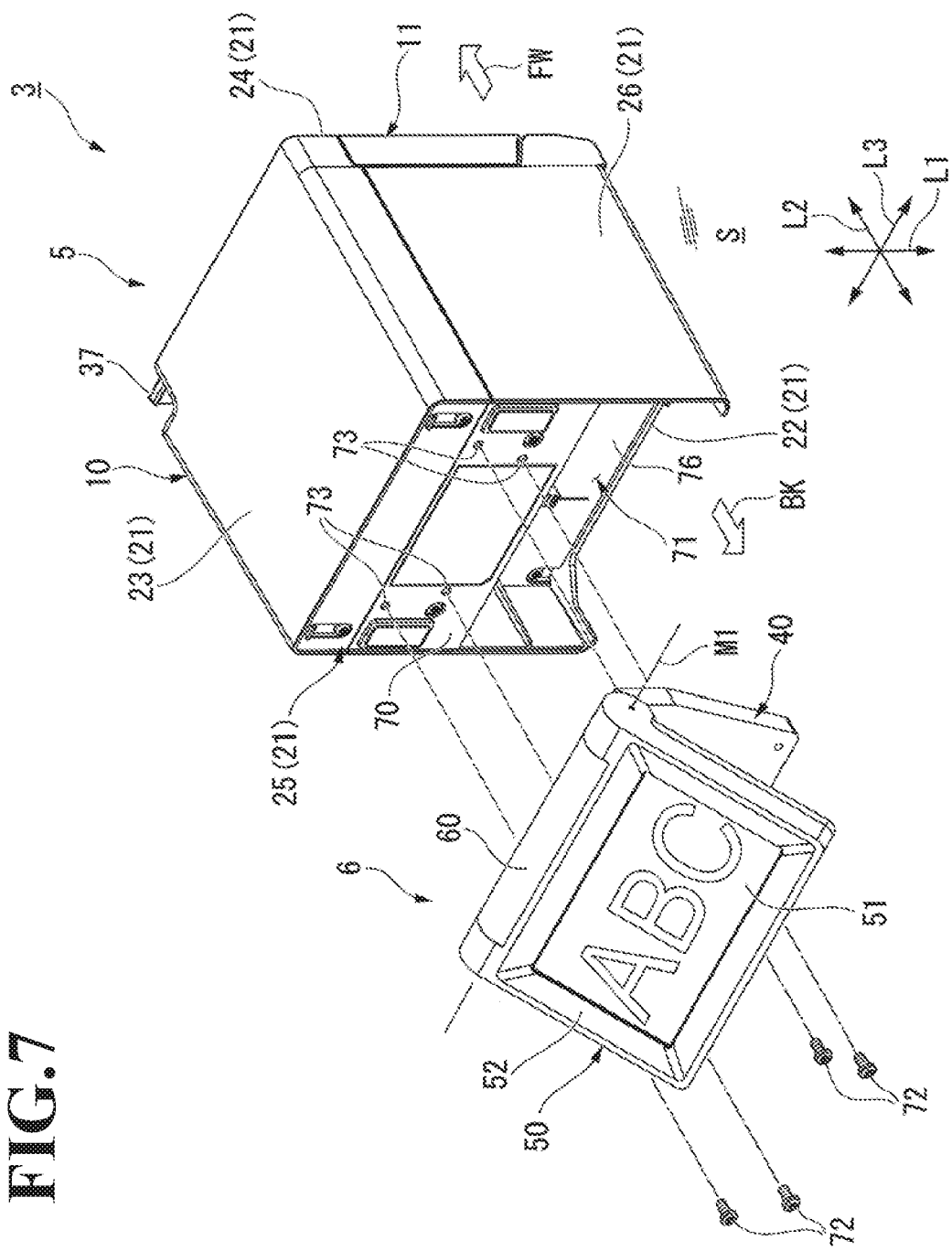
FIG. 7 is a perspective view of the thermal printer in a state in which a printer display device is removed from the state illustrated in FIG. 4.

The back surface 25 side of the casing 10 is briefly described. As illustrated in FIG. 6 and FIG. 7, on the back surface 25 of the casing 10, a mounting surface 70 to which the fixing portion 40 is mounted is formed so as to be positioned in a substantially upper half side of the casing 10, and a connecting recessed portion 71 in which the USB cable 7 is pulled out is formed so as to be positioned below the mounting surface 70. In FIG. 7, the USB cable 7 is omitted.

In the first embodiment, the printer display device 6 is mounted to the mounting surface 70 through use of a plurality of (four) fixing screws 72. The number of the fixing screws 72 is not limited to four and may be appropriately changed.

As illustrated in FIG. 7, a plurality of screw holes 73 into which the plurality of fixing screws 72 are respectively screwed are formed on the mounting surface 70. In the illustrated example, four screw holes 73 are formed so as to correspond to the fixing screws 72, and are formed so as to be arrayed at intervals in the right-and-left direction L3 and the up-and-down direction L1, respectively. As illustrated in FIG. 6 and FIG. 7, the connecting recessed portion 71 is formed so as to be recessed toward the front side from the mounting surface 70 and so as to be opened to the lower side. The connecting recessed portion 71 is defined by a first wall surface 75 oriented toward the lower side and a second wall surface 76 oriented toward the back side. Various kinds of connecting connectors configured to connect the peripheral equipment to the printer main body 5 are provided to the first wall surface 75 and the second wall surface 76.

The USB cable 7 is connected to the back surface 25 side of the casing 10 having the configuration described above so as to be pulled out downward from the first wall surface 75. However, the mode of connection is not limited thereto, and the USB cable 7 may be connected to the back surface 25 side of the casing 10 so as to be pulled out from the second wall surface 76.

A male USB connector 7a is mounted to a distal end part of the USB cable 7. The USB cable 7 can be removably connected to the display portion main body 50 through intermediation of the USB connector 7a. With this, the USB cable 7 connects the casing 10 and the display portion main body 50 to each other. A male USB connector (not shown) may be mounted to a proximal end part of the USB cable 7, and the USB cable 7 may be removably connected to the first wall surface 75 side through intermediation of the USB connector.

The USB cable 7 is arranged on an inner side of the back surface 25 of the casing 10. The USB cable 7 is configured to electrically connect an external connecting board 33C and a display control board 54 described later to each other. The external connecting board 33C is electrically connected to the main board 33B, and the display control board 54 is arranged in the display portion main body 50. The USB cable 7 is configured to communicate at least data (communication signal) related to various kinds of information to be displayed on the display portion 51. In the first embodiment, the USB cable 7 serves also to supply power from the printer main body 5 side to the display portion main body 50 side. However, the supply of power to the display portion main body 50 (power supply method) is not limited thereto. For example, power may be supplied from the peripheral equipment other than the printer main body 5. Alternatively, a power source portion such as a secondary battery may be built in the display portion main body 50 so that power is supplied from the power source portion.

Now, the printer display device 6 is described in detail. As illustrated in FIG. 4 to FIG. 7, the fixing portion 40 has a plate shape to be overlapped with the mounting surface 70 from the back side. In the illustrated example, the fixing portion 40 is formed so that a lateral width thereof along the right-and-left direction L3 is smaller than a lateral width of the casing 10, and has a trapezoidal shape in plan view in which the lateral width is gradually decreased from the upper side toward the lower side. However, the shape of the fixing portion 40 is not limited thereto, and may be appropriately changed. The fixing portion 40 has a plurality of insertion holes (not shown) into which the fixing screws 72 are inserted. The insertion holes are formed so as to correspond to the number and positions of the screw holes 73 formed in the mounting surface 70.

Thus, the fixing portion 40 can be fixed to the mounting surface 70 by screwing the fixing screws 72 into the screw holes 73 through the insertion holes. In addition, the fixing portion 40 can be removed from the mounting surface 70 by removing the fixing screws 72. The printer display device 6 can be removably mounted to the back surface 25 of the casing 10 of the printer main body 5 through use of the fixing screws 72. In particular, through use of the fixing screws 72, the fixing portion 40 can be firmly fixed to the mounting surface 70 under a state of being appropriately brought into contact therewith. Thus, the printer display device 6 can be mounted with reduced backlash, and a stable mounting state can be maintained.

A relief hole 41 is formed in a lower part of the fixing portion 40. The relief hole 41 passes through the fixing portion 40 in the front-and-back direction L2 and is opened to the lower side. The relief hole 41 is formed in a center part of the fixing portion 40 in the right-and-left direction L3, and has a trapezoidal shape in plan view in which an opening width along the right-and-left direction L3 is gradually increased downward. However, the shape of the relief hole 41 is not limited thereto, and may be appropriately changed.

The display portion main body 50 includes a display case 52 having a rectangular shape in plan view having a predetermined thickness. The display case 52 has a rectangular shape that is longer in the right-and-left direction L3 than in the up-and-down direction L1. In the illustrated example, the display case 52 is formed so that the lateral width thereof along the right-and-left direction L3 is slightly larger than that of the fixing portion 40 and is smaller than that of the casing 10. Thus, the printer display device 6 is designed so as to be accommodated within the lateral width size of the casing 10.

In the display case 52, there are provided the display portion 51 configured to display various kinds of information and the display control board 54 (not shown) (see FIG. 1) having a display control portion 53 configured to control the display portion 51 mounted thereon. The display control portion 53 is configured to control the display portion 51 to display information, for example, based on data related to various kinds of information sent through the USB cable 7.

The display portion 51 is arranged so as to be is exposed in a large area on a front surface side of the display case 52. Examples of the display portion 51 include a color or monochromatic liquid crystal display (LCD) configured to perform segment display, a monochromatic or full-color high-definition liquid crystal display, and an organic EL display. However, the kind of the display portion 51 is not limited thereto, and another kind may be adopted as long as various kinds of information can be displayed. Further, for example, when a liquid crystal display, an organic EL display, or the like is adopted as the display portion 51, the display portion 51 may also include various kinds of functions such as a stereoscopic image display function and a touch panel function. In this case, it is only required that the display portion 51 adaptable to each function be appropriately selected, and various kinds of programs and the like be incorporated into the display control portion 53 so that each function is exhibited.

A female USB connector (not shown) to which the USB connector 7a of the USB cable 7 is connected is formed on a back surface (surface opposed to the fixing portion 40) side of the display case 52. The female USB connector is formed at a position that is opposed to the relief hole 41 formed in the fixing portion 40 when the display case 52 is arranged so as to be overlapped with the fixing portion 40. With this, even when the display case 52 is overlapped with the fixing portion 40 under a state in which the USB connector 7a of the USB cable 7 is connected to the female USB connector, the USB cable 7 can be relieved into the relief hole 41. Therefore, the display portion main body 50 can be overlapped with the fixing portion 40 without being influenced by the USB cable 7.

An upper end part of the fixing portion 40 having the configuration described above and an upper end part of the display case 52 of the display portion main body 50 are coupled to each other through intermediation of the hinge portion 60. The hinge portion 60 has a rotation axis M1 that extends in parallel to each of the installation surface S and the back surface 25 of the casing 10, that is, along the right-and-left direction L3. With this, the display portion main body 50 is coupled to the fixing portion 40 so as to be rotated about the rotation axis M1 through intermediation of the hinge portion 60.

Figure 8:
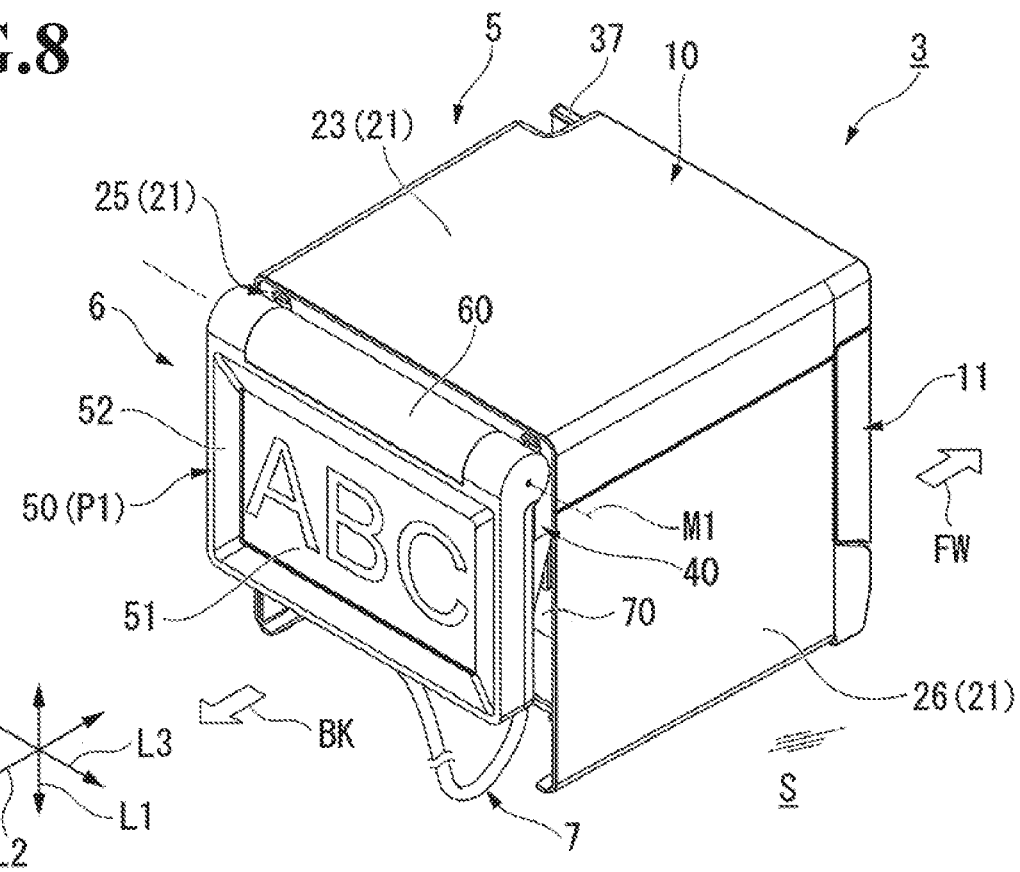
FIG. 8 is a perspective view of the thermal printer in a state in which a display portion main body illustrated in FIG. 4 is arranged so as to be overlapped with a fixing portion.
Figure 9:
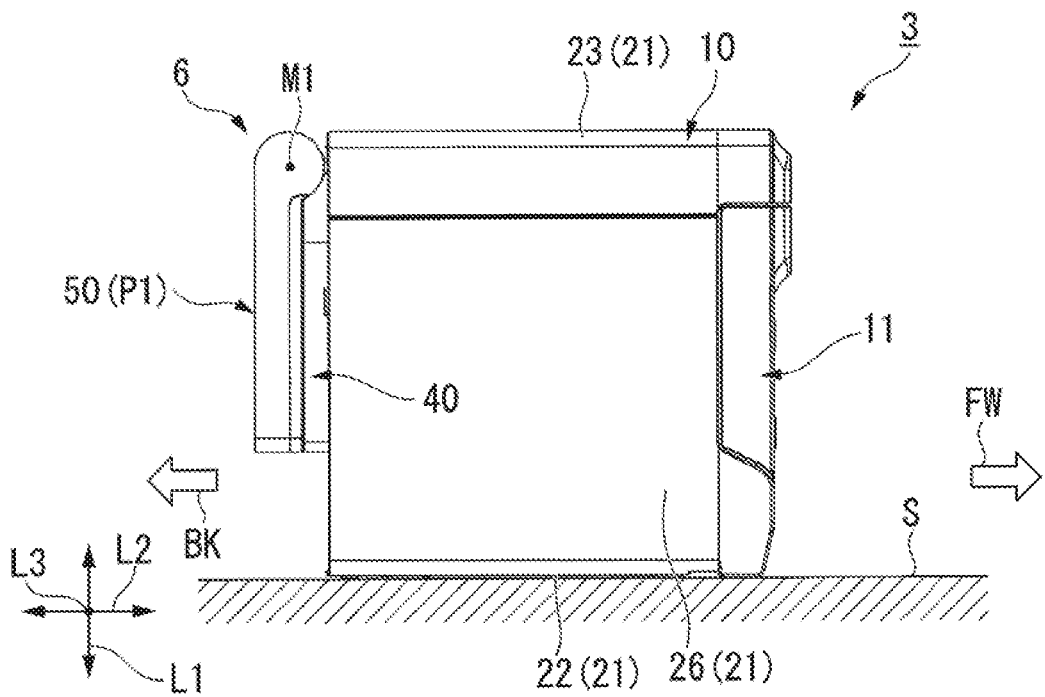
FIG. 9 is a side view of the thermal printer illustrated in FIG. 8.
Figure 10:
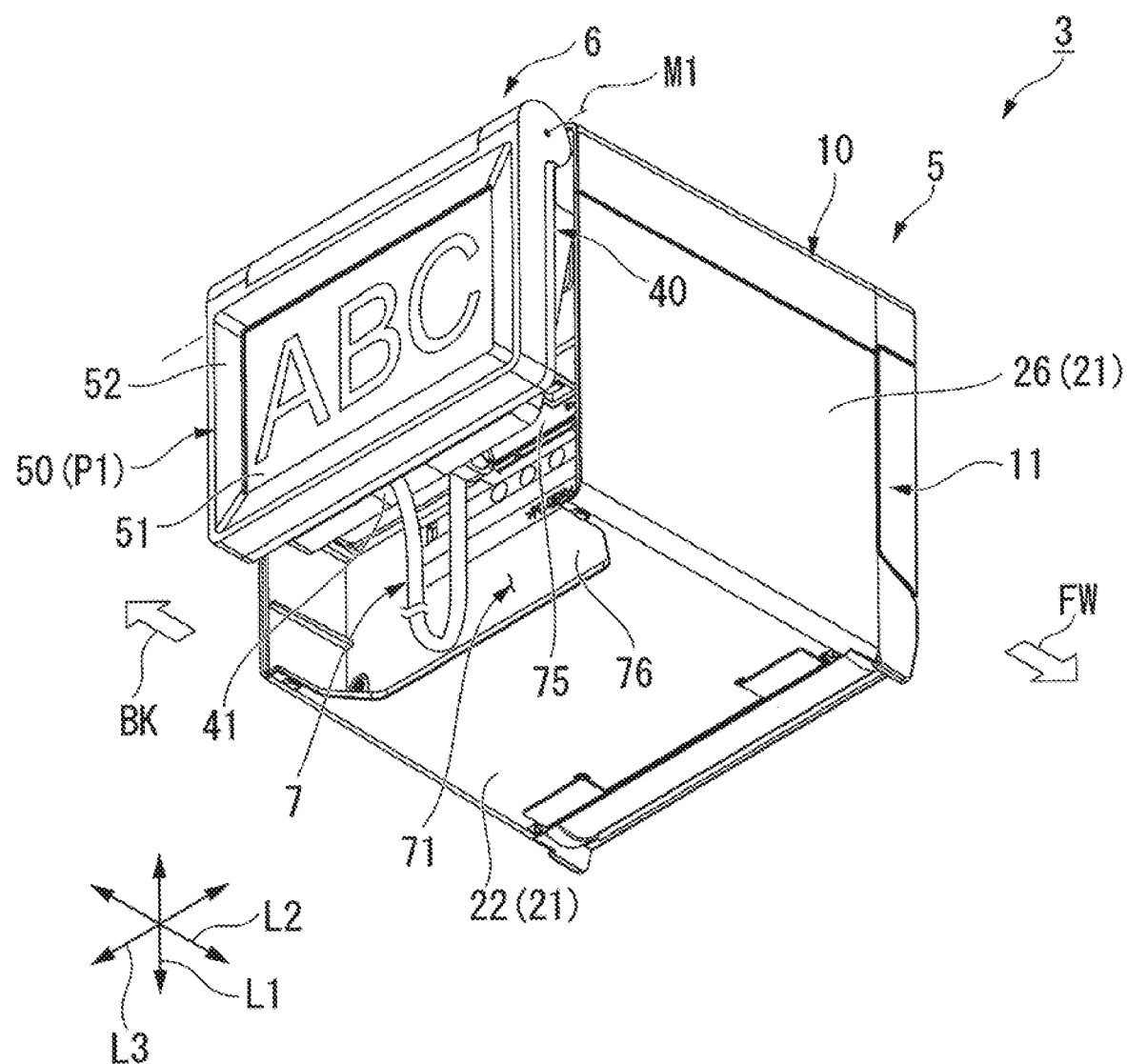
FIG. 10 is a perspective view of the thermal printer illustrated in FIG. 8 when viewed from the bottom surface side.
Figure 11:
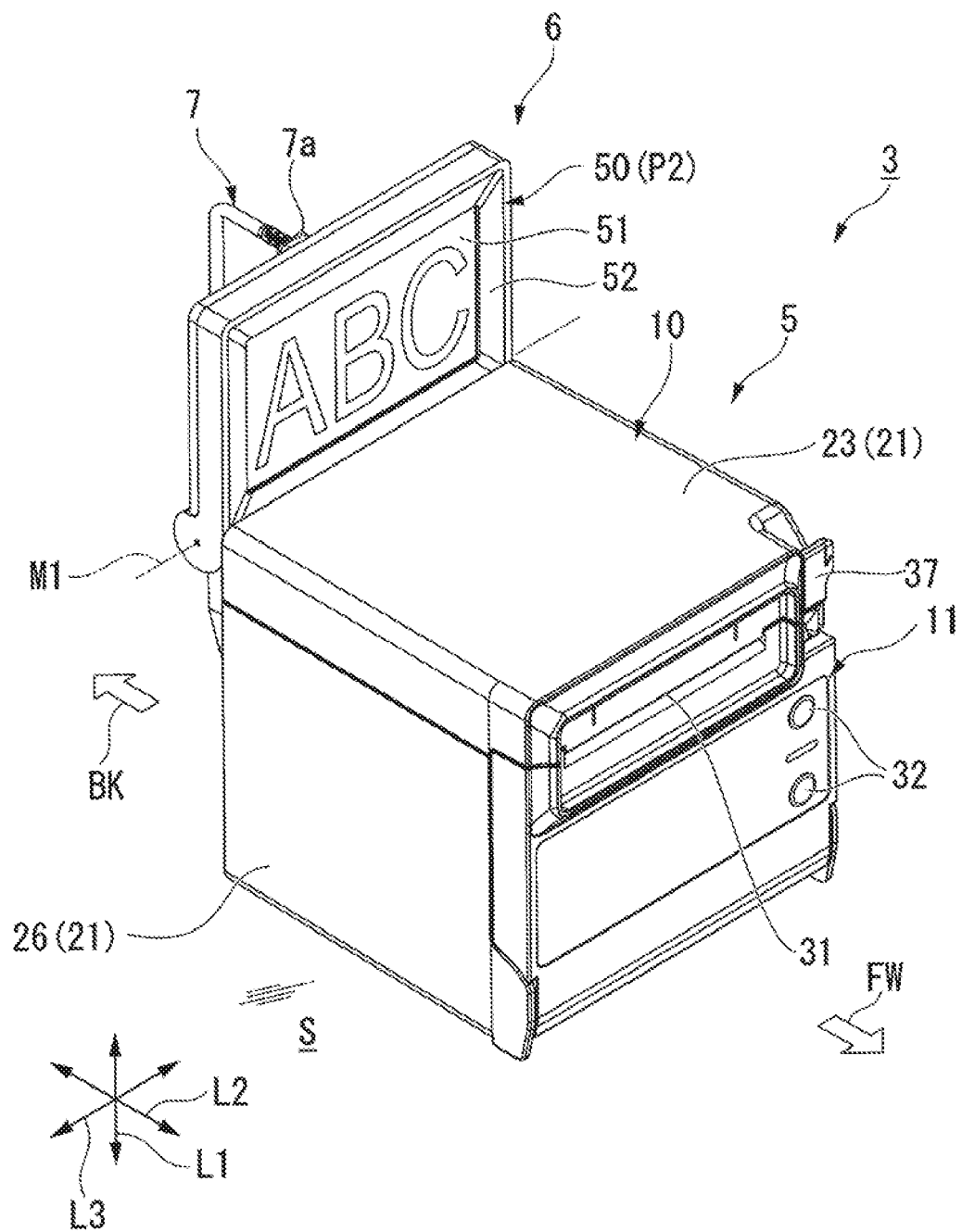
FIG. 11 is a perspective view of the thermal printer in a state in which the display portion main body illustrated in FIG. 8 is rotated upward by 180° with respect to the fixing portion.
Figure 12:
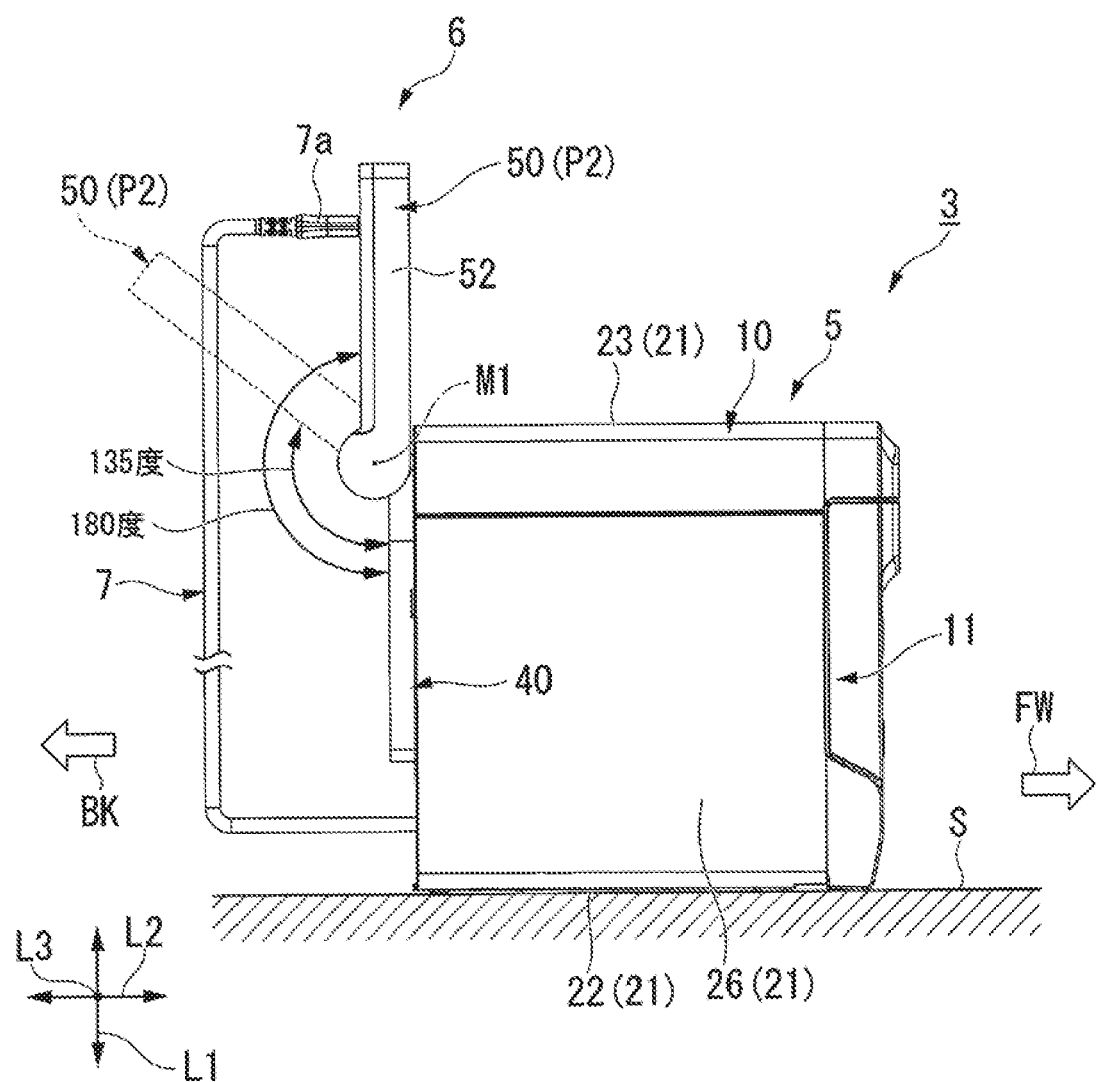
FIG. 12 is a side view of the thermal printer illustrated in FIG. 11.
Figure 13:
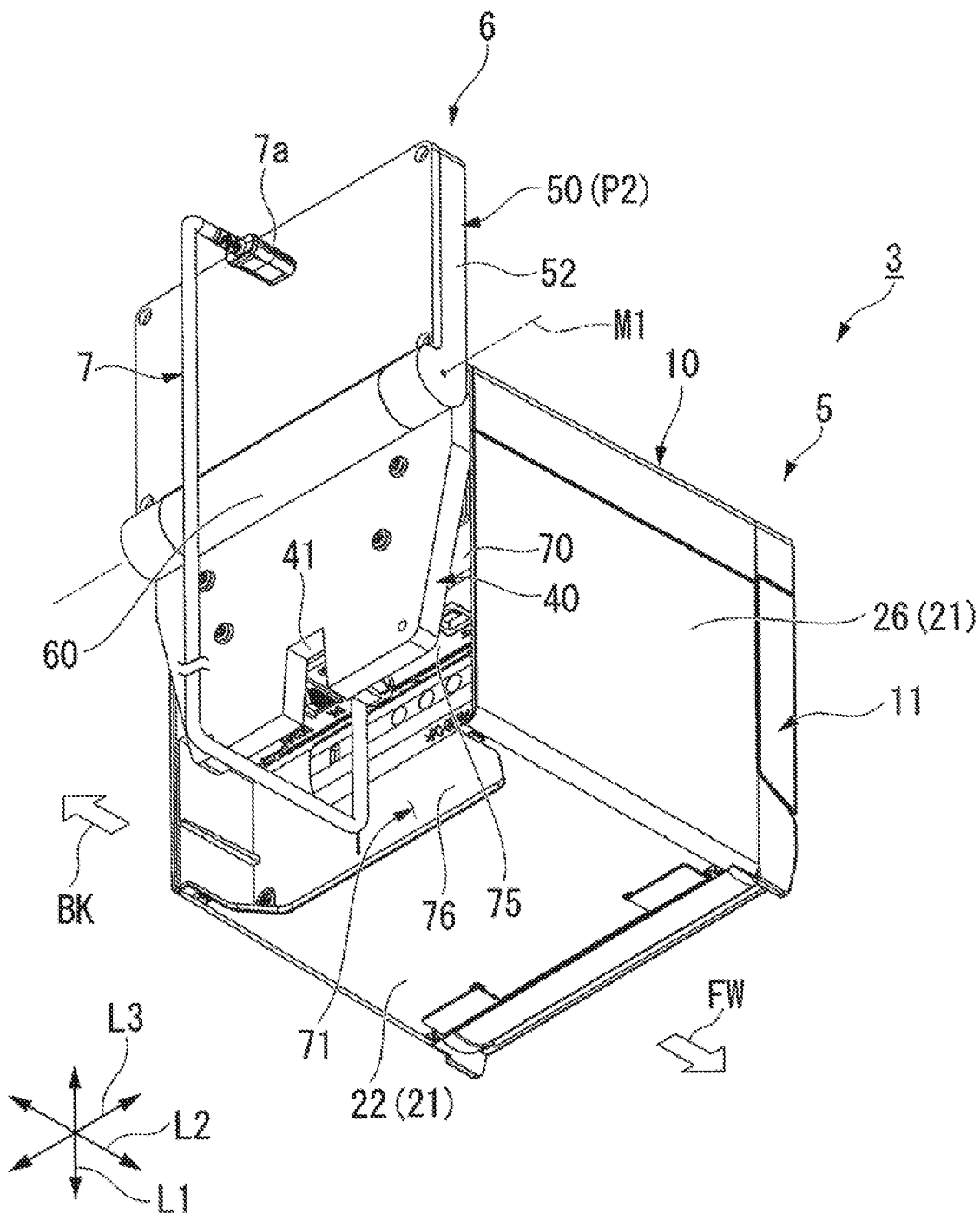
FIG. 13 is a perspective view of the thermal printer illustrated in FIG. 11 when viewed from the bottom surface side.

The display portion main body 50 is configured to be displaced by rotation about the rotation axis M1 between a first position P1 at which the display portion main body 50 is overlapped with the fixing portion 40 as illustrated in FIG. 8 to FIG. 10, and a second position P2 at which the display portion 51 is positioned above the top surface 23 of the casing 10 as illustrated in FIG. 11 to FIG. 13. Specifically, the display portion main body 50 is configured to be rotated within a rotation angle range of 180° about the rotation axis M1 from the first position P1 as illustrated in FIG. 11 to FIG. 13. The second position P2 is set to be a position at which the display portion main body 50 is rotated by 135° or more about the rotation axis M1 from the first position P1.

The hinge portion 60 includes therein a rotation shaft (not shown) that extends along the rotation axis M1. The hinge portion 60 is configured to rotatably couple the fixing portion 40 and the display case 52 through use of the rotation shaft. The hinge portion 60 further includes therein an angle adjusting mechanism (not shown) configured to position the display portion main body 50 at a freely selected rotation angle when the display portion main body 50 is rotated about the rotation axis M1. Examples of the angle adjusting mechanism include a mechanism, which includes a damper mechanism configured to impart a predetermined rotation resistance force to the rotation shaft, and which is configured to hold the posture of the display portion main body 50 at a freely selected rotation angle in a non-step manner with the rotation resistance force. Further, another examples of the angle adjusting mechanism include a mechanism configured to hold the posture of the display portion main body 50 at any rotation angle in a stepwise manner through use of a change in mechanical load or the like.

As described above, the angle adjusting mechanism is provided in the hinge portion 60. Therefore, when the display portion main body 50 is set at a freely selected rotation angle by being rotated about the rotation axis M1, the display portion main body 50 can be maintained at that position.

Next, description is given of the case utilizing the thermal printer 3 having the configuration described above. As illustrated in FIG. 2 and FIG. 4, in the thermal printer 3, the printer cover 11 and the delivery slot 31 are arranged on the front surface 24 side of the casing 10, and the printer display device 6 is arranged on the back surface 25 side of the casing 10. Therefore, for example, the thermal printer 3 can be used in the following manner. The thermal printer 3 is installed at a store under a state in which the delivery slot 31 is oriented toward the side of a staff of the store, and the printer display device 6 is oriented toward the side of a customer who uses the store. Thus, the printed recording paper P can be given to the store staff side while various kinds of information is provided to the customer through use of the display portion 51. Therefore, a printer that is convenient and is excellent in operability can be obtained.

Further, the printer display device 6 is directly mounted to the back surface 25 side of the casing 10 so as to be separable therefrom. Therefore, the printer display device 6 can be held without use of the printer stand unlike the related art. Therefore, the installation space corresponding to the printer stand can be omitted, and the entire thermal printer 3 also including the printer display device 6 can be installed only in the installation space corresponding to the casing 10. Thus, the space can be saved, and the space at the store can be effectively utilized through efficient use of the space on the periphery of the thermal printer 3. Further, the printer stand is not required unlike the related art. Therefore, cost of components can be saved accordingly, and the cost of the entire thermal printer 3 can be saved.

In particular, in the printer display device 6, the fixing portion 40 and the display portion main body 50 having the display portion 51 provided thereon are coupled to each other through intermediation of the hinge portion 60, and the display portion main body 50 can be displaced relative to the fixing portion 40 through use of the hinge portion 60. With this, an orientation of the display portion 51 can be suitably adjusted as required without changing the installation position of the thermal printer 3. Thus, the display portion 51 can be visually recognized with satisfactory visibility irrespective of the installation position, and for example, a display content (various kinds of information) can be clearly given to a store staff or a customer.

Figure 5:
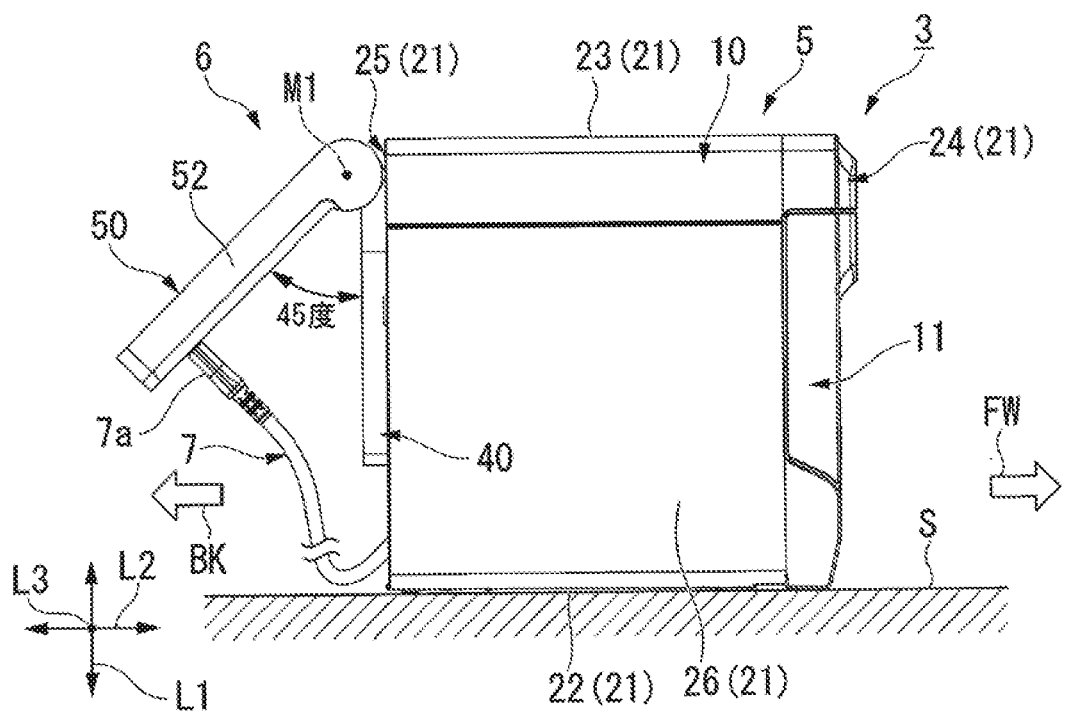
FIG. 5 is a side view of the thermal printer illustrated in FIG. 4.

The orientation of the display portion 51 is described in more detail. The rotation axis M1 extends along the right-and-left direction L3, and hence the display portion main body 50 can be displaced relative to the fixing portion 40 while the display portion main body 50 is rotated upward or downward about the rotation axis M1. Accordingly, the angle can be adjusted so that the display portion 51 is oriented toward the upper side while the display portion main body 50 is rotated so as to be opened to the upper side from the first position P1 illustrated in FIG. 8 to FIG. 10. As illustrated in FIG. 4 to FIG. 6, the display portion main body 50 can be set to a position at which the display portion main body 50 is rotated by 45° from the first position P1. With this, for example, the store staff can satisfactorily visually recognize the display portion 51 by directing a line of sight downward in a standing posture. Thus, the visibility of the printer display device 6 can be further enhanced.

Further, when the display portion main body 50 is further rotated about the rotation axis M1 to be displaced to a position rotated by 135° or more from the first position P1, that is, a position falling within an angle range of from 135° to 180°, the display portion main body 50 can be displaced to the second position P2 as illustrated in FIG. 11 to FIG. 13. FIG. 11 to FIG. 13 are each a view for illustrating a state in which the display portion main body 50 is rotated by 180° from the first position P1.

When the display portion main body 50 is displaced to the second position P2, the display portion 51 can be positioned above the top surface 23 of the casing 10. With this, the display portion 51 can be visually recognized from the delivery slot 31 side. As a result, a person (for example, store staff) who receives the printed recording paper P can visually recognize the display portion 51, and required information can be given to the person who receives the printed recording paper P. Thus, through displacement of the display portion main body 50 to the second position P2, a variety of methods of use, which cannot be achieved with the related-art printer stand, can be implemented, and the thermal printer 3 excellent in convenience can be obtained.

In particular, the display portion main body 50 can be rotated by 180° from the first position P1. Therefore, the display portion 51 is likely to be visually recognized more clearly from the delivery slot 31 side, and visibility can be further enhanced. In the case of the method of use in which the recording paper P printed by the thermal printer 3 is issued as a ticket to be received by a customer, for example, the customer can receive the ticket while visually recognizing the display portion 51.

In addition, it is preferred to provide a function of automatically or suitably switching the vertical direction of a display content (various kinds of information) to be displayed on the display portion 51 in accordance with the rotation angle of the display portion main body 50. With this, for example, a display content ("ABC" in each figure) to be displayed on the display portion 51 can be appropriately inverted vertically as illustrated in FIG. 1. When the vertical direction of the display content is automatically switched, for example, it is only required to have a configuration in which a detection portion configured to detect the rotation angle of the hinge portion 60 is provided, and the display control portion 53 switches the vertical direction of the display content based on the detection result of the detection portion. In addition, when the vertical direction of the display content is suitably switched, for example, it is only required to have a configuration in which a switch and the like capable of performing an external operation are provided to the casing 10 or the display case 52, and the display control portion 53 switches the vertical direction of the display content based on switch-on or switch-off by the store staff or the like.

As described above, in the thermal printer 3 and the printer display device 6 according to the first embodiment, high visibility can be ensured, and space and cost can be saved.

Further, in the thermal printer 3 according to the first embodiment, the printer display device 6 can be separated and removed from the casing 10 by removing the fixing screws 72. With this, the printer display device 6 can also be installed independently under a state of being separated from the thermal printer 3 within a cable range of the USB cable 7.

Figure 14:
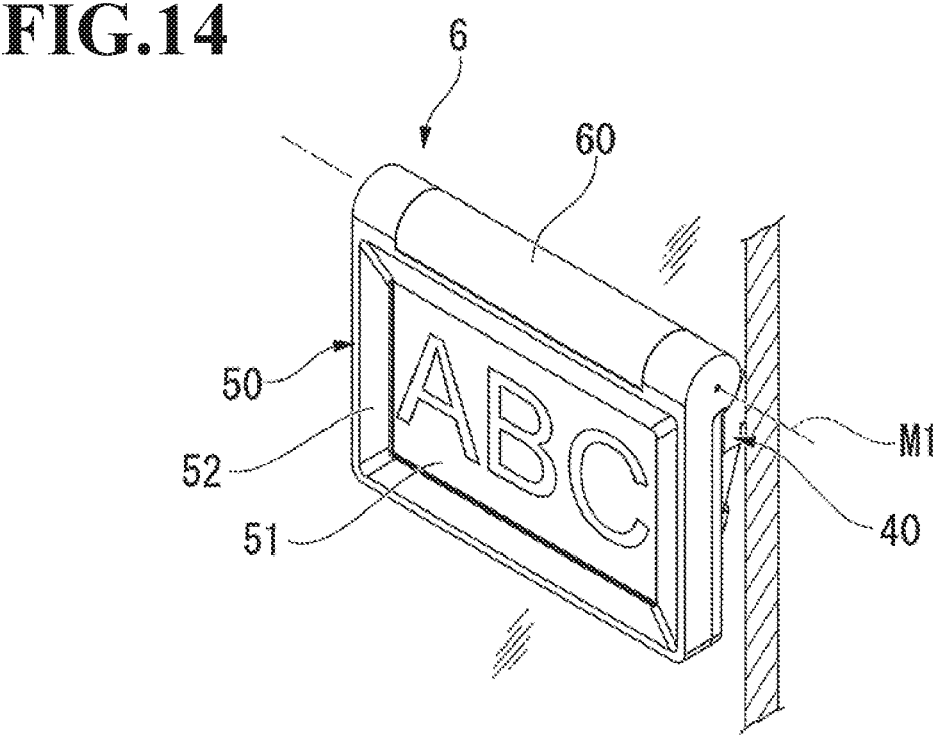
FIG. 14 is a perspective view of the printer display device in a state in which the printer display device removed in FIG. 7 is used under a condition of being fixed to a wall.
Figure 15:
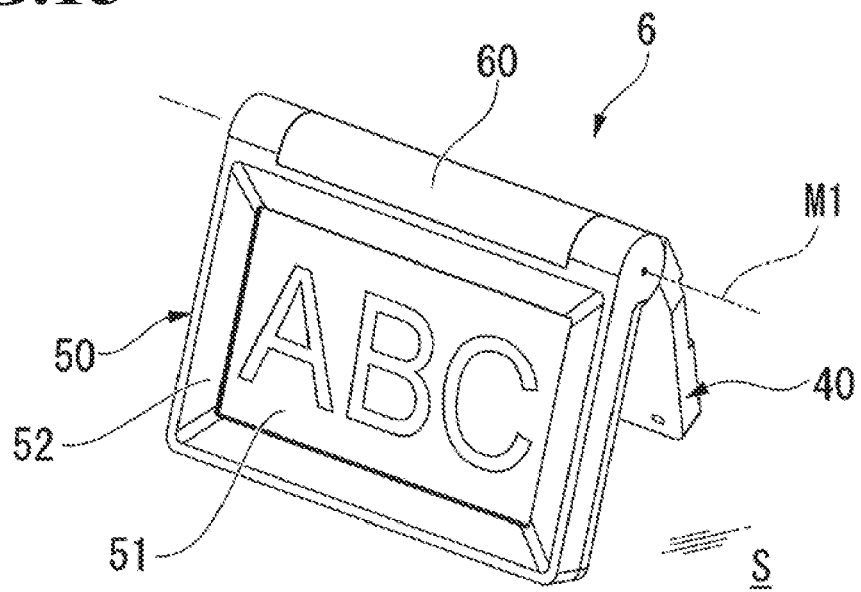
FIG. 15 is a perspective view of the printer display device in a state in which the printer display device removed in FIG. 7 is used under a condition of being installed on an installation surface.

Thus, for example, the printer display device 6 can be used under a condition of being fixed to a wall as illustrated in FIG. 14. Alternatively, the printer display device 6 can be used under a condition of being installed on the installation surface S at a store so as to be adjacent to the thermal printer 3 as illustrated in FIG. 15. In FIG. 14 and FIG. 15, the thermal printer 3 and the USB cable 7 are omitted.

Figure 16:
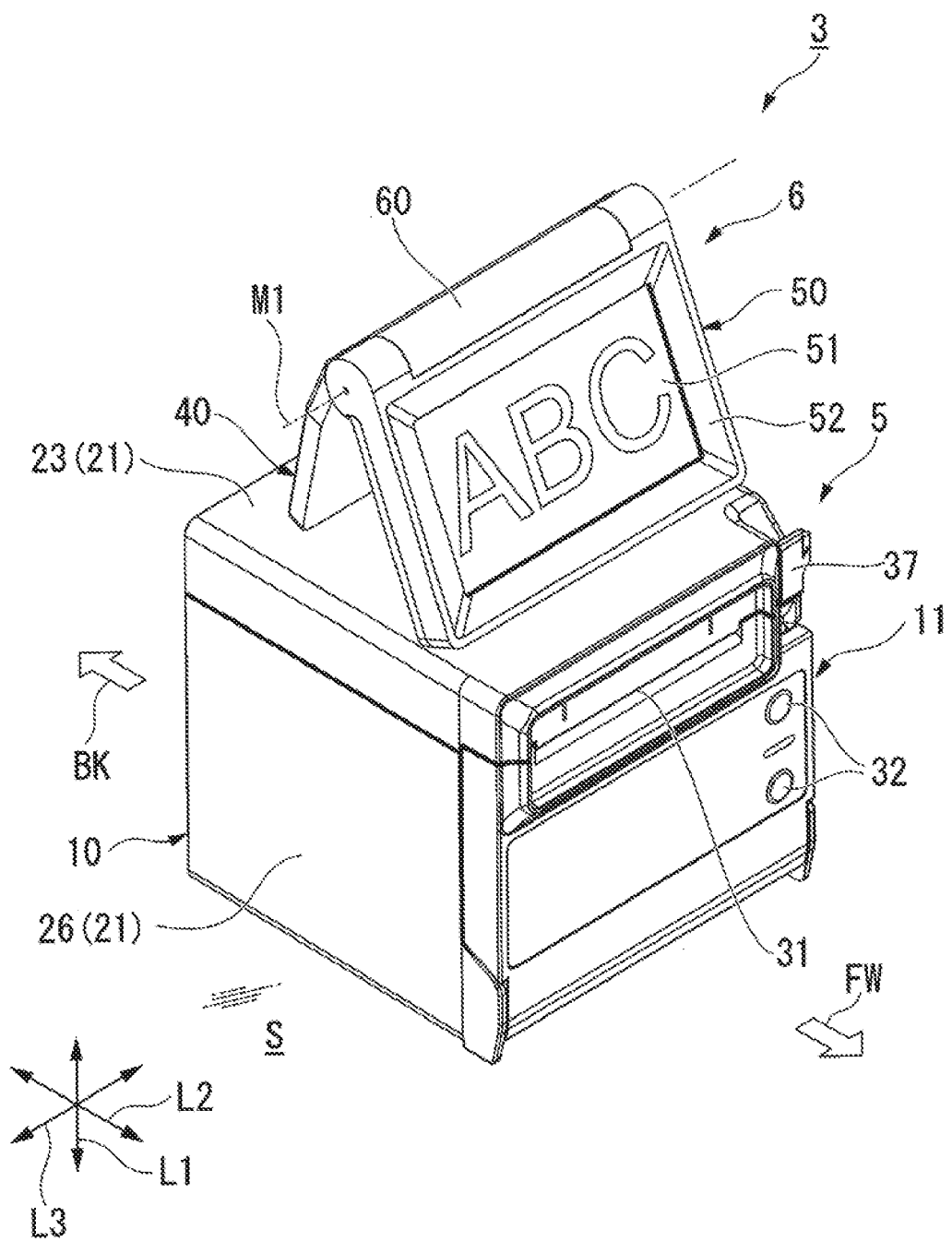
FIG. 16 is a perspective view of the thermal printer in a state in which the printer display device removed in FIG. 7 is used under a condition of being installed on a top surface of a casing.
Figure 17:
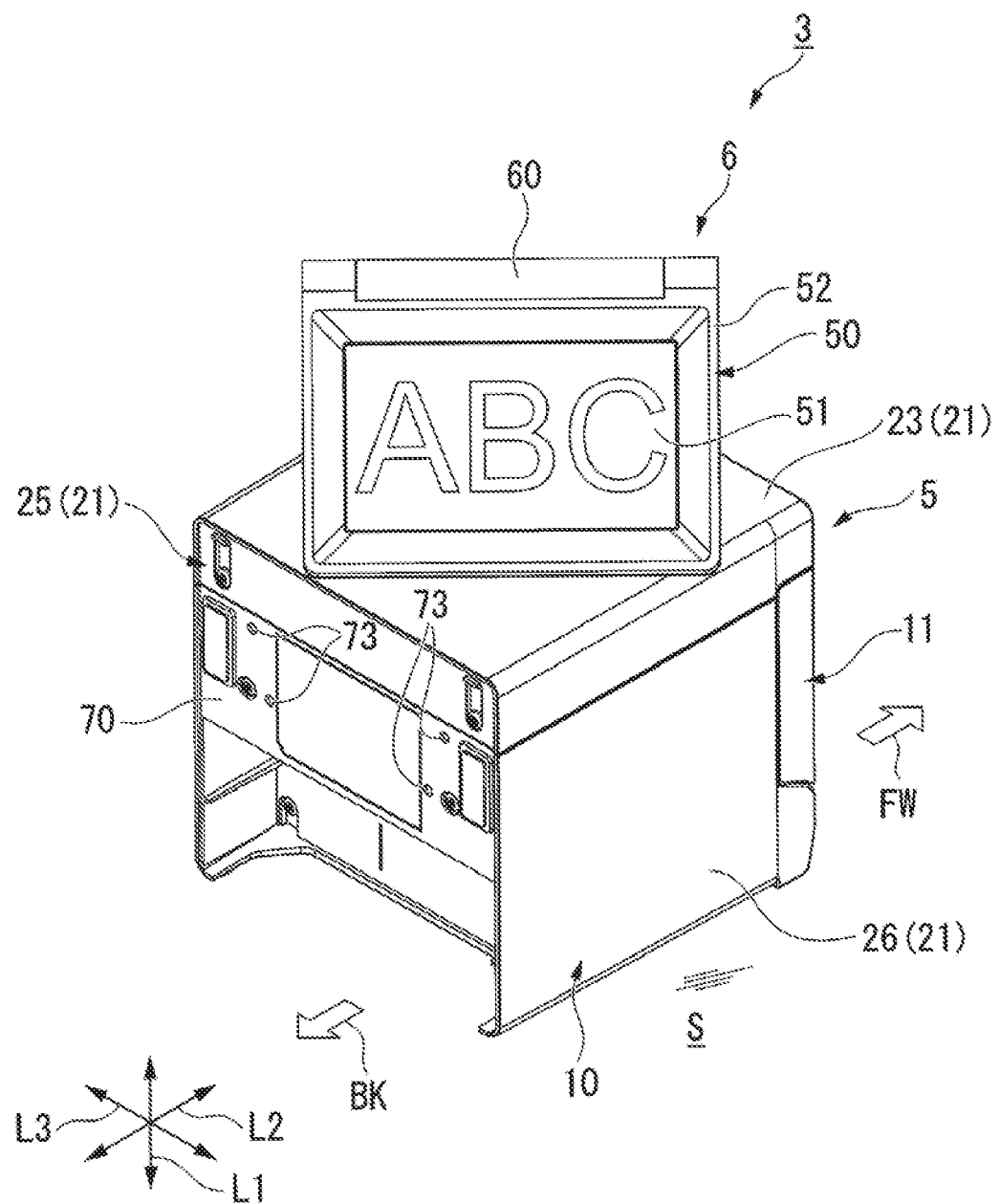
FIG. 17 is a perspective view of the thermal printer in a state in which the printer display device removed in FIG. 7 is used under a condition of being installed on the top surface of the casing.

Further, for example, the printer display device 6 can also be used under a condition of being installed on the top surface 23 of the casing 10 under a state in which the display portion 51 is oriented toward the delivery slot 31 side as illustrated in FIG. 16. Alternatively, the printer display device 6 can also be used under a condition of being installed on the top surface 23 of the casing 10 under a state in which the display portion 51 is oriented toward the back surface 25 side of the casing 10 as illustrated in FIG. 17. In FIG. 16 and FIG. 17, the USB cable 7 is omitted.

As described above, the printer display device 6 can also be used under a state of being removed from the casing 10. Therefore, the printer display device 6 can be used by a variety of methods of use in accordance with the situation, and the thermal printer 3, which is convenient and excellent in versatility and has a high degree of freedom in design, can be obtained.

Second Embodiment

Next, a second embodiment of the present invention is described with reference to the drawings. In the second embodiment, the same components as those in the first embodiment are denoted by the same reference symbols as those therein, and description thereof is omitted.

Figure 18:
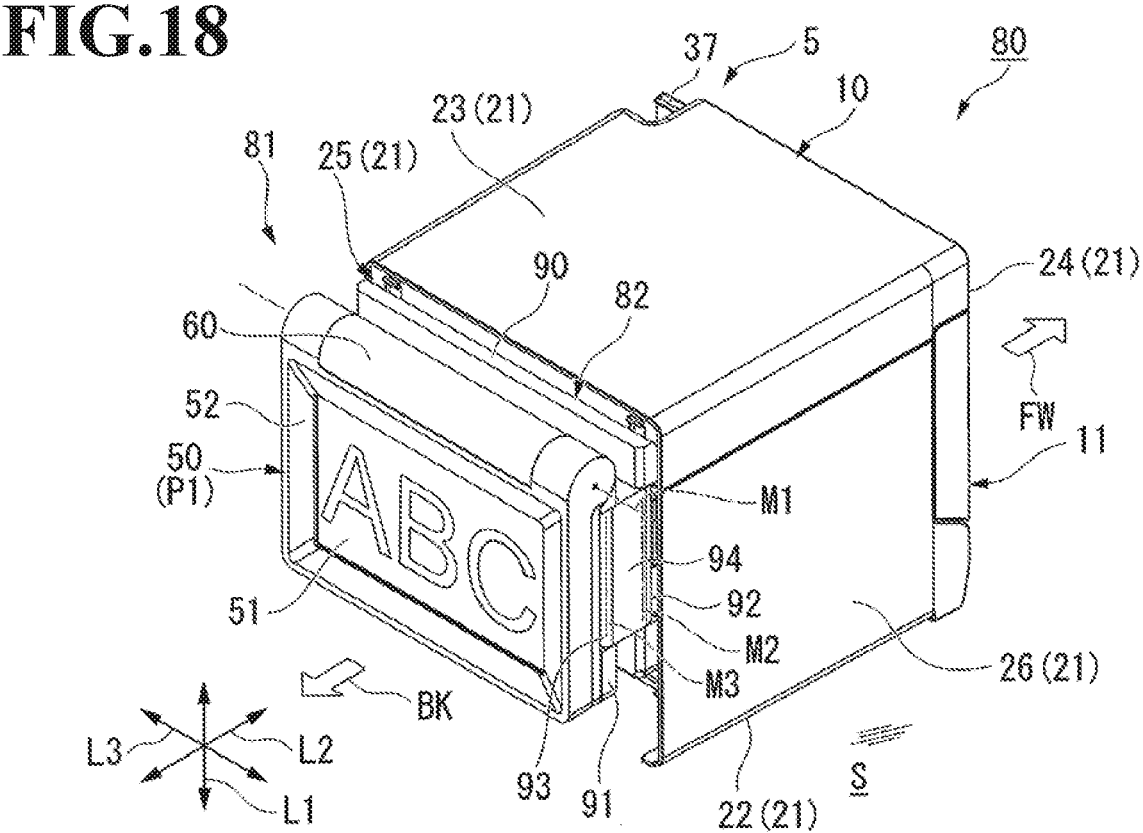
FIG. 18 is a perspective view of a thermal printer according to a second embodiment of the present invention when viewed from a back surface side.
Figure 19:
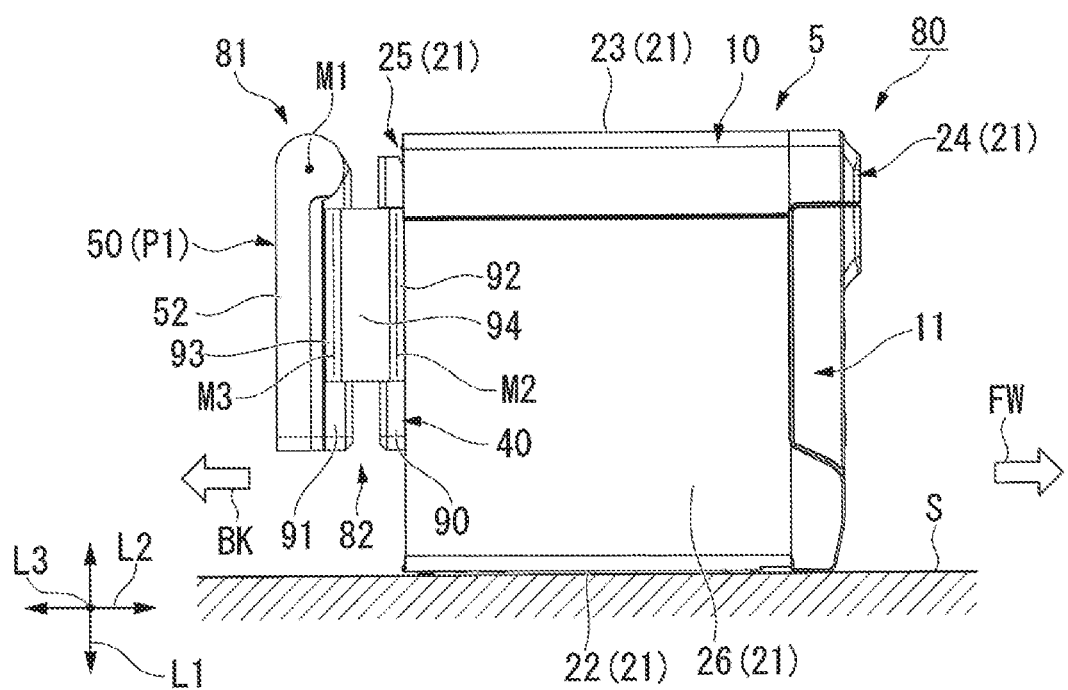
FIG. 19 is a side view of the thermal printer illustrated in FIG. 18.

As illustrated in FIG. 18 and FIG. 19, a thermal printer 80 according to the second embodiment includes a fixing portion 82 and a printer display device 81 including the display portion main body 50 and the hinge portion 60. In the second embodiment, the USB cable 7 is omitted.

Figure 20:
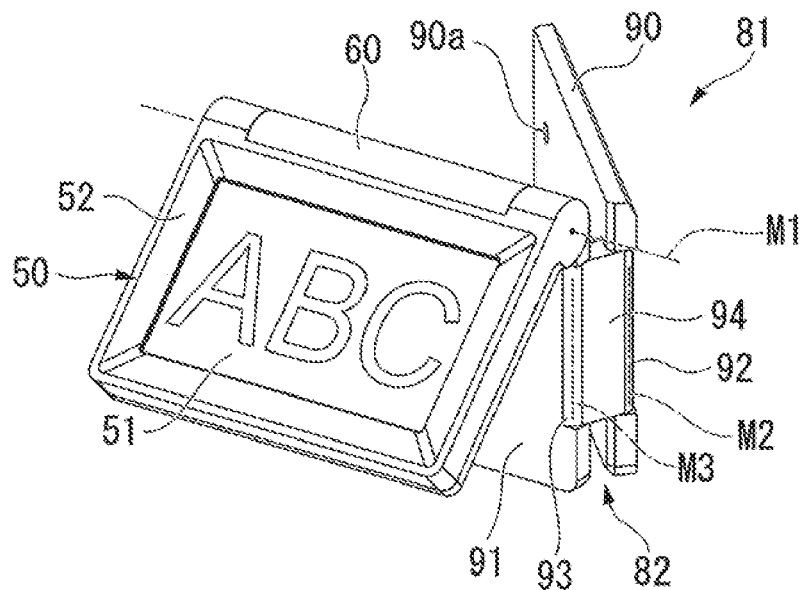
FIG. 20 is a perspective view of a printer display device illustrated in FIG. 18.

As illustrated in FIG. 18 to FIG. 20, the fixing portion 82 includes a first base portion 90, a second base portion 91, and a coupling plate (coupling member according to the present invention) 94. The first base portion 90 is separably mounted to the mounting surface 70 on the back surface 25 side of the casing 10 through use of the fixing screws 72. The display portion main body 50 is coupled to the second base portion 91 through intermediation of the hinge portion 60. The coupling plate 94 is configured to couple the first base portion 90 and the second base portion 91 to each other so that the second base portion 91 can be displaced relative to the first base portion 90 through intermediation of a first auxiliary hinge portion (auxiliary hinge portion according to the present invention) 92 and a second auxiliary hinge portion (auxiliary hinge portion according to the present invention) 93.

The first base portion 90 has a plate shape to be overlapped with the mounting surface 70 from the back side. In the illustrated example, the first base portion 90 has a rectangular shape in plan view, which is longer in the right-and-left direction L3 than in the up-and-down direction L1, so that the lateral width along the right-and-left direction L3 is smaller than that of the casing 10. The first base portion 90 has insertion holes 90a (see FIG. 20) into which the fixing screws 72 are inserted.

Thus, the first base portion 90 can be fixed to the mounting surface 70 by screwing the fixing screws 72 into the screw holes 73 through the insertion holes 90a. In addition, the first base portion 90 can be removed from the mounting surface 70 by removing the fixing screws 72. As described above, the printer display device 81 can be removably mounted to the back surface 25 of the casing 10 of the printer main body 5 through use of the fixing screws 72.

A first relief hole 95 (see FIG. 28) is formed in a lower part of the first base portion 90. The first relief hole 95 passes through the first base portion 90 in the front-and-back direction L2 and is opened to the lower side. The first relief hole 95 is formed in a center part of the first base portion 90 in the right-and-left direction L3.

The second base portion 91 is arranged on the back side of the first base portion 90 under a state of being distanced from the first base portion 90 and has a plate shape having substantially the same size as that of the first base portion 90. A second relief hole 96 (see FIG. 28) is formed in a lower part of the second base portion 91. The second relief hole 96 passes through the second base portion 91 in the front-and-back direction L2 and is opened to the lower side. The second relief hole 96 is formed in a center part of the second base portion 91 in the right-and-left direction L3. The USB cable 7 can be relieved into the first relief hole 95 and the second relief hole 96 as required. An upper end part of the second base portion 91 and an upper end part of the display case 52 of the display portion main body 50 are coupled to each other through intermediation of the hinge portion 60.

The coupling plate 94 has a plate shape that is longer in the up-and-down direction L1 than in the front-and-back direction L2 under a state in which the first base portion 90 and the second base portion 91 are arranged so as to be opposed to each other. The coupling plate 94 is coupled to an end part on one side in the right-and-left direction L3 in the first base portion 90 through intermediation of the first auxiliary hinge portion 92, and is coupled to an end part on one side in the right-and-left direction L3 in the second base portion 91 through intermediation of the second auxiliary hinge portion 93. With this, the coupling plate 94 couples the first base portion 90 and the second base portion 91 to each other through intermediation of the first auxiliary hinge portion 92 and the second auxiliary hinge portion 93.

The first auxiliary hinge portion 92 has a rotation axis M2 extending along the up-and-down direction L1. Similarly, the second auxiliary hinge portion 93 has a rotation axis M3 extending along the up-and-down direction L1. With this, the second base portion 91 can be displaced relative to the first base portion 90 while being rotated about the two rotation axes M2 and M3 so that the second base portion 91 is opened in an in-plane direction parallel to the installation surface S.

Even when the thermal printer 80 having the configuration described above is used, the same action and effect as those of the first embodiment can be exhibited. In addition, the following action and effect can be further exhibited.

Specifically, the second base portion 91 can be displaced relative to the first base portion 90 through use of the first auxiliary hinge portion 92, the second auxiliary hinge portion 93, and the coupling plate 94, and the display portion main body 50 can be further displaced relative to the displaced second base portion 91 through use of the hinge portion 60. Therefore, the position of the display portion main body 50 can be further freely adjusted. Thus, the orientation of the display portion 51 can be more finely and freely adjusted, and the display portion 51 can be visually recognized with more satisfactory visibility.

Figure 21:
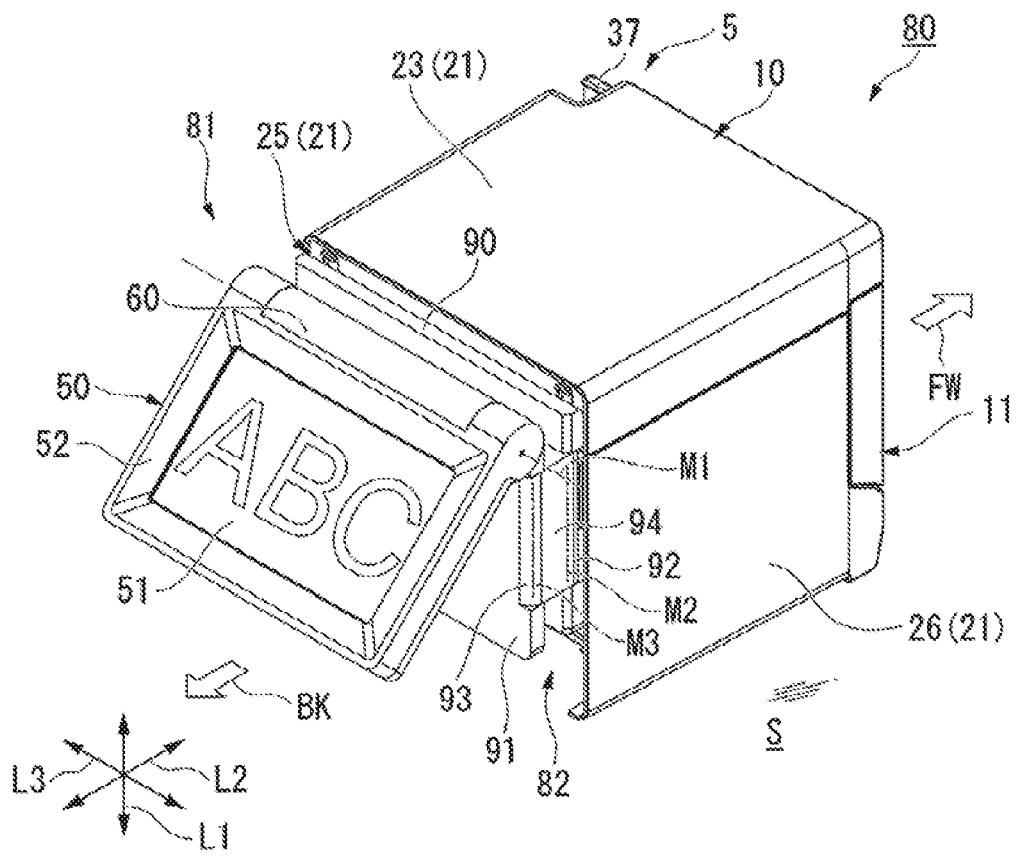
FIG. 21 is a perspective view of the thermal printer in a state in which the printer display device is rotated upward by 45° from the state illustrated in FIG. 18.
Figure 22:
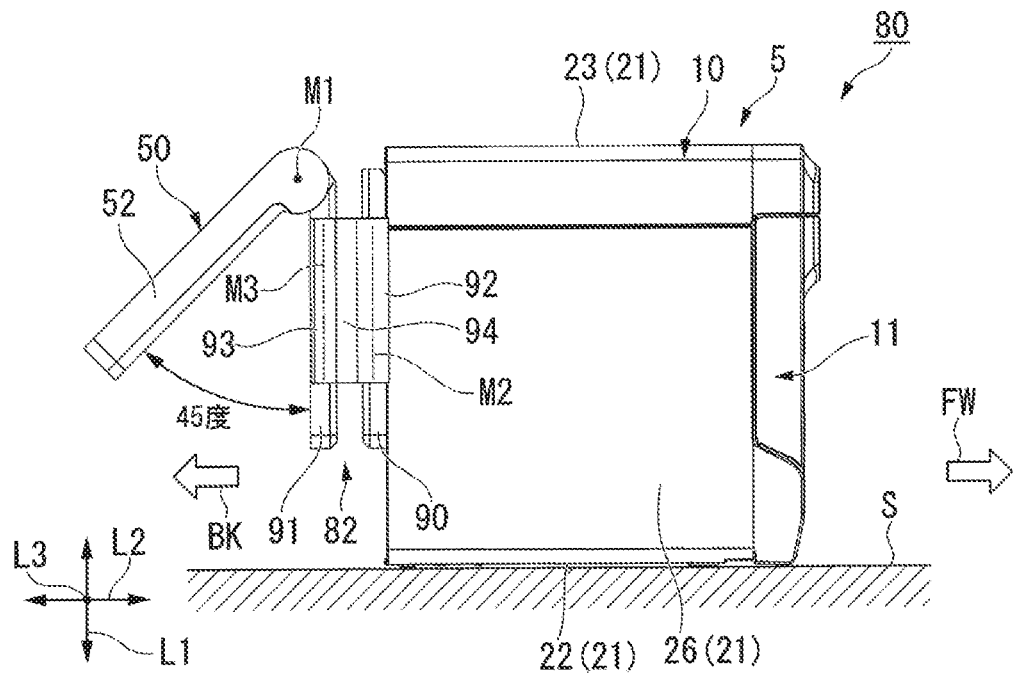
FIG. 22 is a side view of the thermal printer illustrated in FIG. 21.
Figure 23:
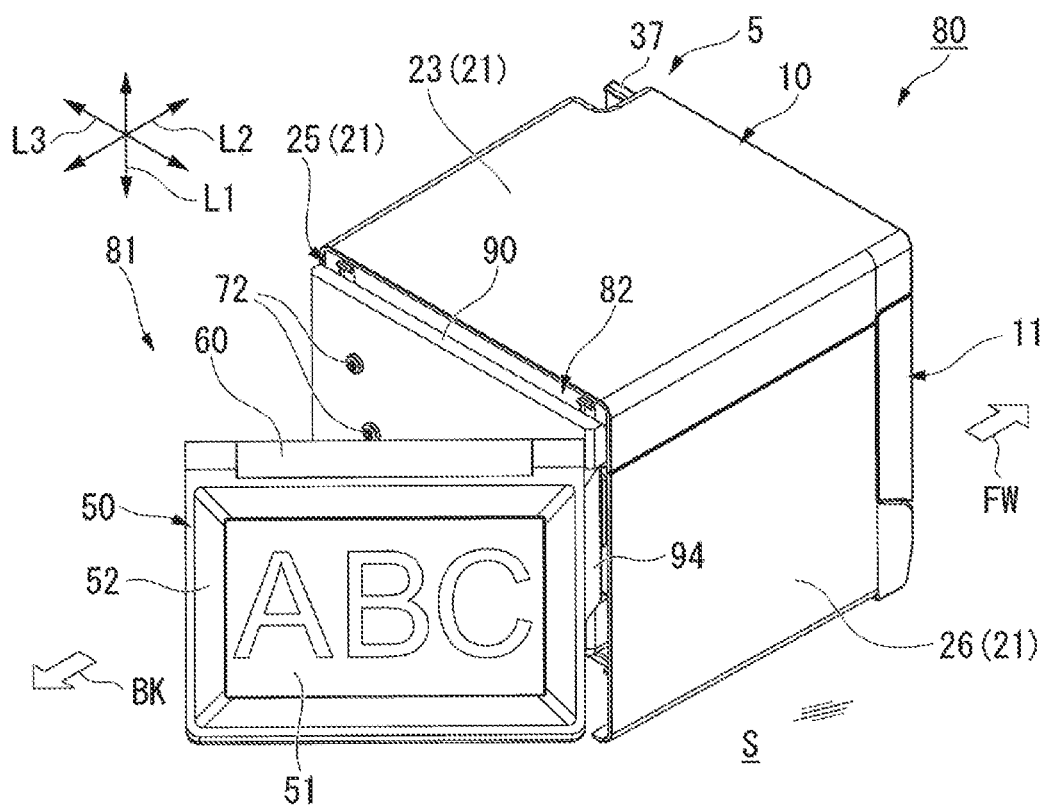
FIG. 23 is a perspective view of the thermal printer in a state in which the printer display device is rotated by 45° in an in-plane direction parallel to an installation surface from the state illustrated in FIG. 21.
Figure 24:
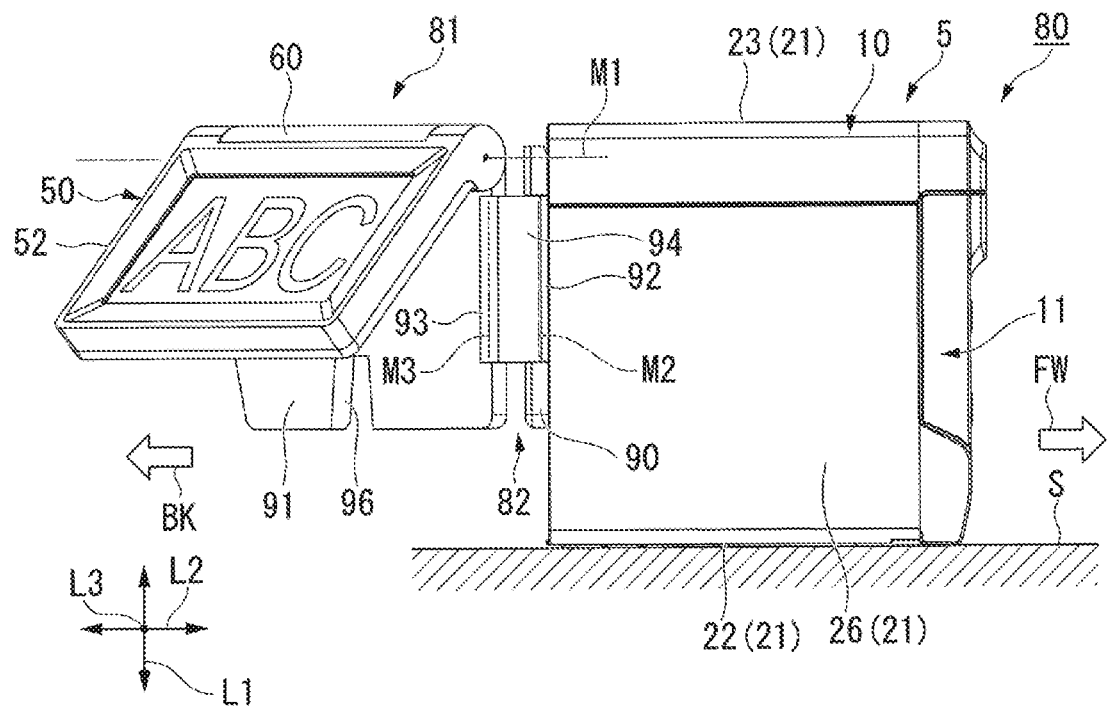
FIG. 24 is a side view of the thermal printer illustrated in FIG. 23.
Figure 25:
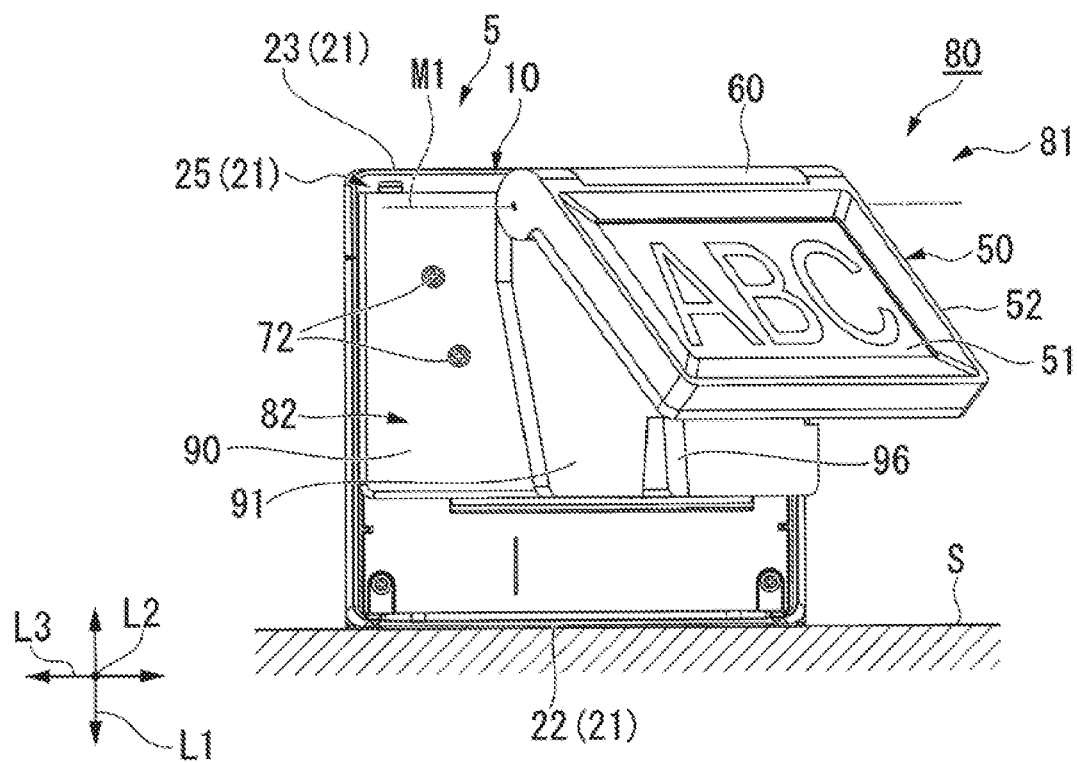
FIG. 25 is a rear view of the thermal printer illustrated in FIG. 23 when viewed from the back surface side.
Figure 26:
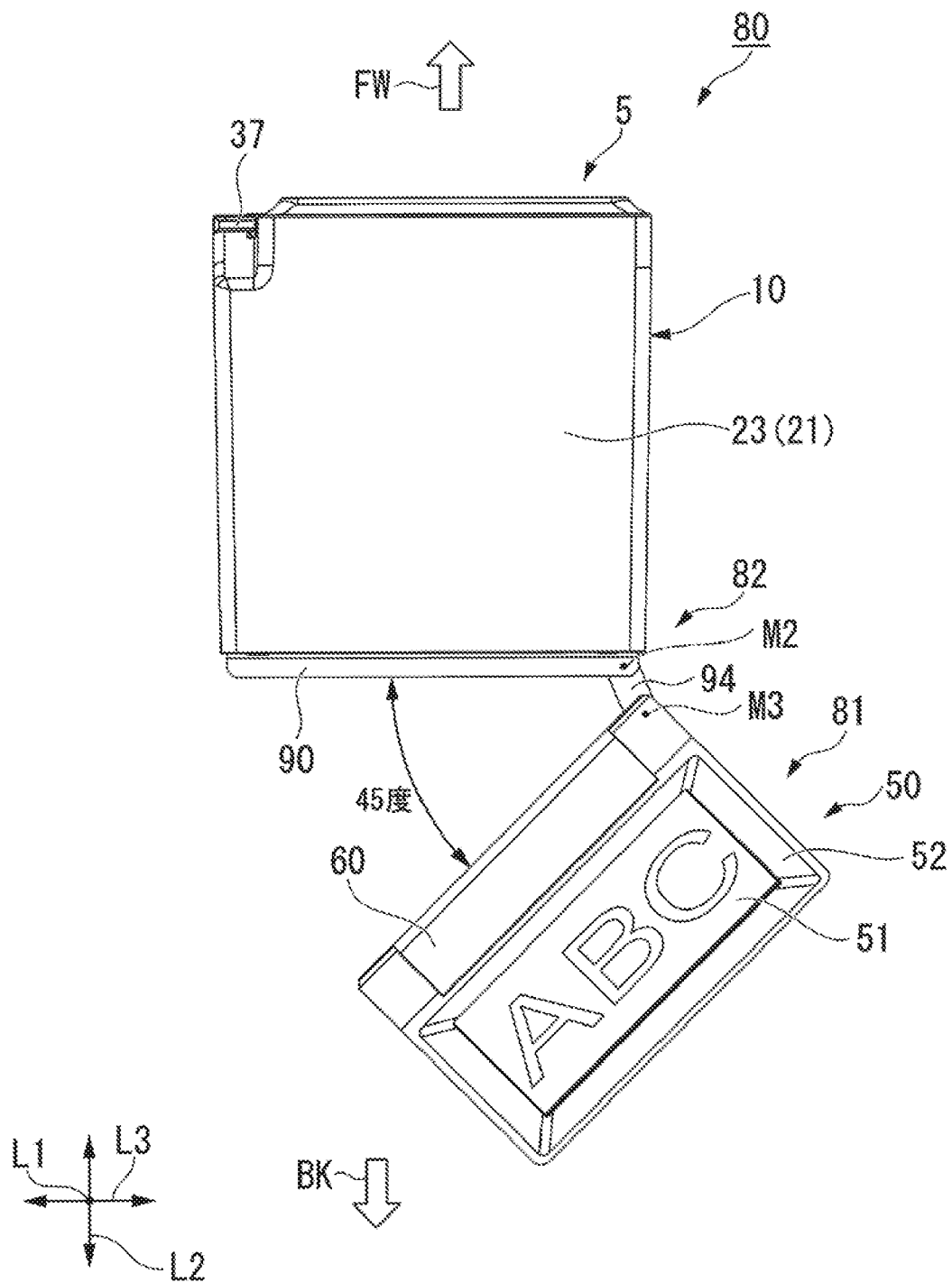
FIG. 26 is a top view of the thermal printer illustrated in FIG. 23.

For example, when the display portion main body 50 is rotated upward about the rotation axis M1 as illustrated in FIG. 21 and FIG. 22 to be set to a position at an upward rotation angle of 45° from the state in which the display portion main body 50 is positioned at the first position P1 as illustrated in FIG. 18 and FIG. 19, and then, the second base portion 91 is rotated about the rotation axis M2 and the rotation axis M3 as illustrated in FIG. 23 to FIG. 26, the orientation of the display portion 51 can be set to be diagonally backward at 450.

Figure 27:
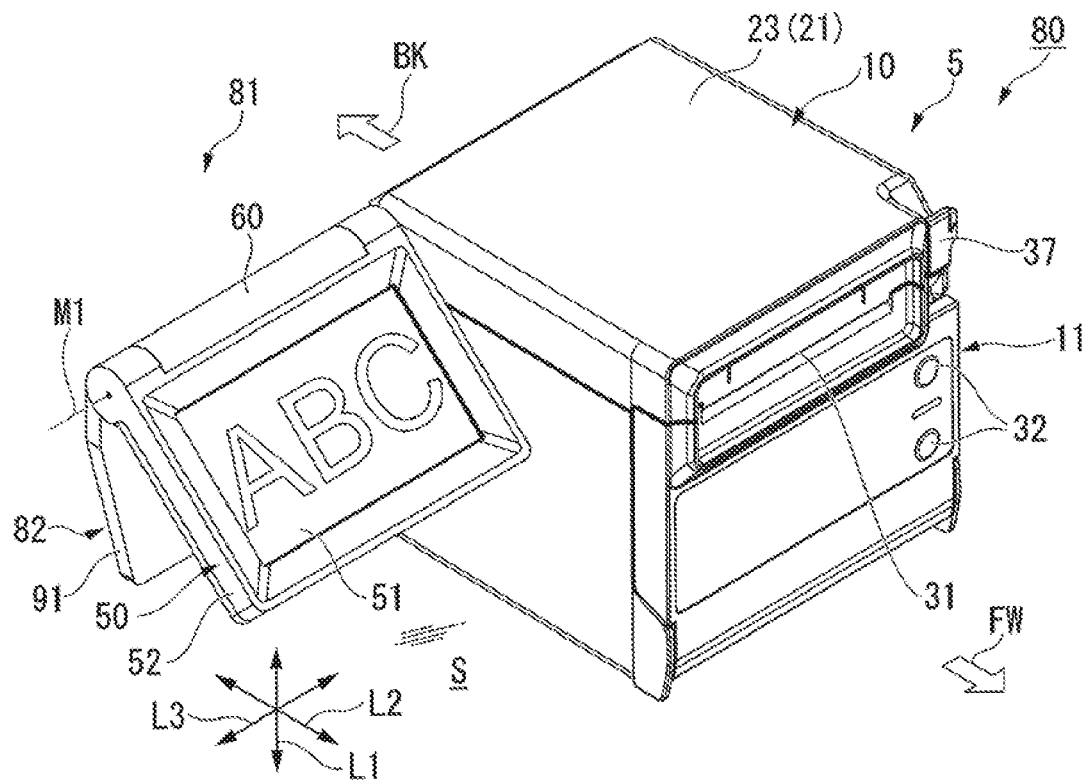
FIG. 27 is a perspective view of the thermal printer in a state in which the printer display device is further rotated in the in-plane direction parallel to the installation surface from the state illustrated in FIG. 23, to thereby direct a display portion to a front side.
Figure 28:
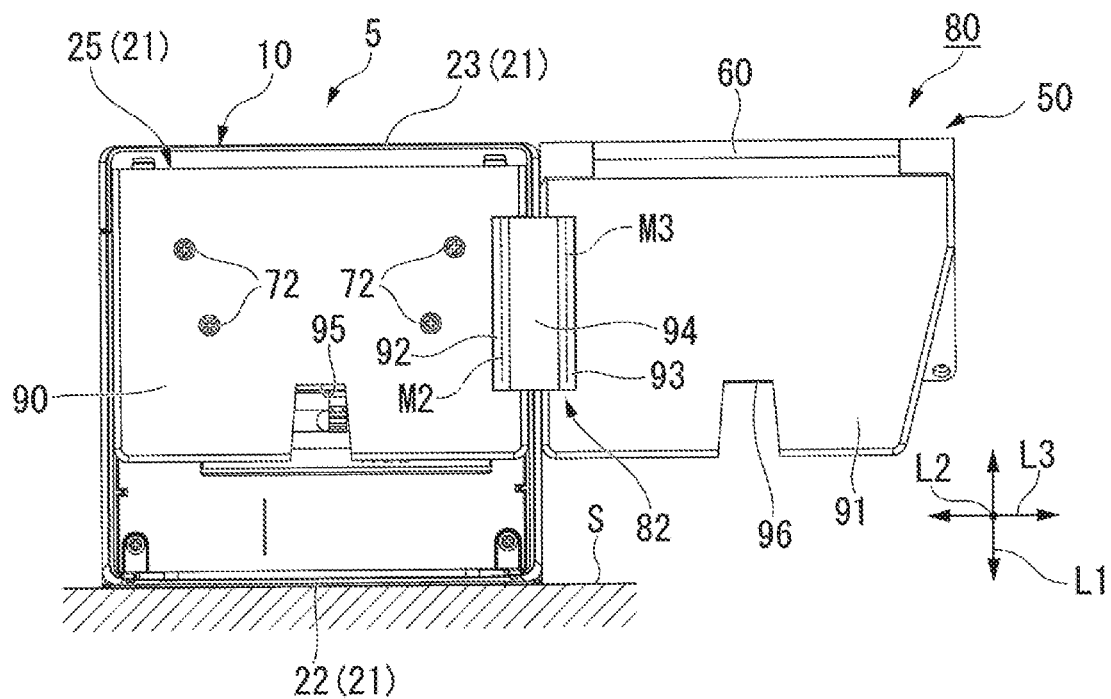
FIG. 28 is a rear view of the thermal printer illustrated in FIG. 27 when viewed from the back surface side.

Further, when the second base portion 91 is further rotated about the rotation axis M2 and the rotation axis M3 from the above-mentioned state as illustrated in FIG. 27 and FIG. 28 to be set to a position opened by 180° in an in-plane direction parallel to the installation surface S with respect to the first base portion 90, the display portion 51 can be oriented toward the front side while keeping the upward posture at 450. In particular, the coupling plate 94 is used, and hence the second base portion 91 can be set to be adjacent to the first base portion 90 in the right-and-left direction L3. Thus, the display portion 51 can be directed straight to the front side.

The embodiments of the present invention have been described above. However, those embodiments are presented as examples and are not intended to limit the scope of the invention. Those embodiments may be implemented in other various modes, and various kinds of omissions, replacements, and modifications can be made without departing from the gist of the invention. The embodiments and modification examples thereof include, for example, those which can be easily assumed by a person skilled in the art, those which are substantially the same, and those which fall within a scope of equivalence.

For example, in each of the above-mentioned embodiments, the description has been given of the example of the thermal printer of a forward delivery type in which the recording paper P is delivered to the front side. However, the present invention is not limited thereto, and for example, a thermal printer of an upward delivery type in which the recording paper P is delivered to the upper side may be used. In addition, in each of the above-mentioned embodiments, the description has been given of the example of the thermal printer as one example of a printer. However, the present invention is not limited thereto, and for example, an inkjet printer or the like, in which the recording paper P is printed through use of ink droplets, may be used.

Further, in each of the above-mentioned embodiments, the description has been given of the case in which the printer display device is mounted to the back surface 25 side of the casing 10. However, the present invention is not limited thereto, and it is only required that the printer display device be mounted to the outer surface 21 other than the bottom surface 22. For example, the printer display device may be mounted to the top surface 23 or the side surface 26 of the casing 10.

Further, in each of the above-mentioned embodiments, the description has been given of the case in which the display control board 54 having the display control portion 53 mounted thereon is provided on the display portion main body 50 side. However, the present invention is not limited thereto. For example, a fixing portion may be formed as a fixing case including, inside thereof, the display control board 54 having the display control portion 53 mounted thereon, and only the display portion 51 may be provided to the display portion main body 50. In this case, it is only required that the USB cable 7 be connected to the fixing case side.

Further, in each of the above-mentioned embodiments, the description has been given of the case in which the printer display device is mounted to the mounting surface 70 on the back surface 25 of the casing 10 through use of the fixing screws 72. However, the present invention is not limited to the fixing screws 72, and another means may be adopted as long as the printer display device can be separably (removably) mounted to the mounting surface 70.

Figure 29:
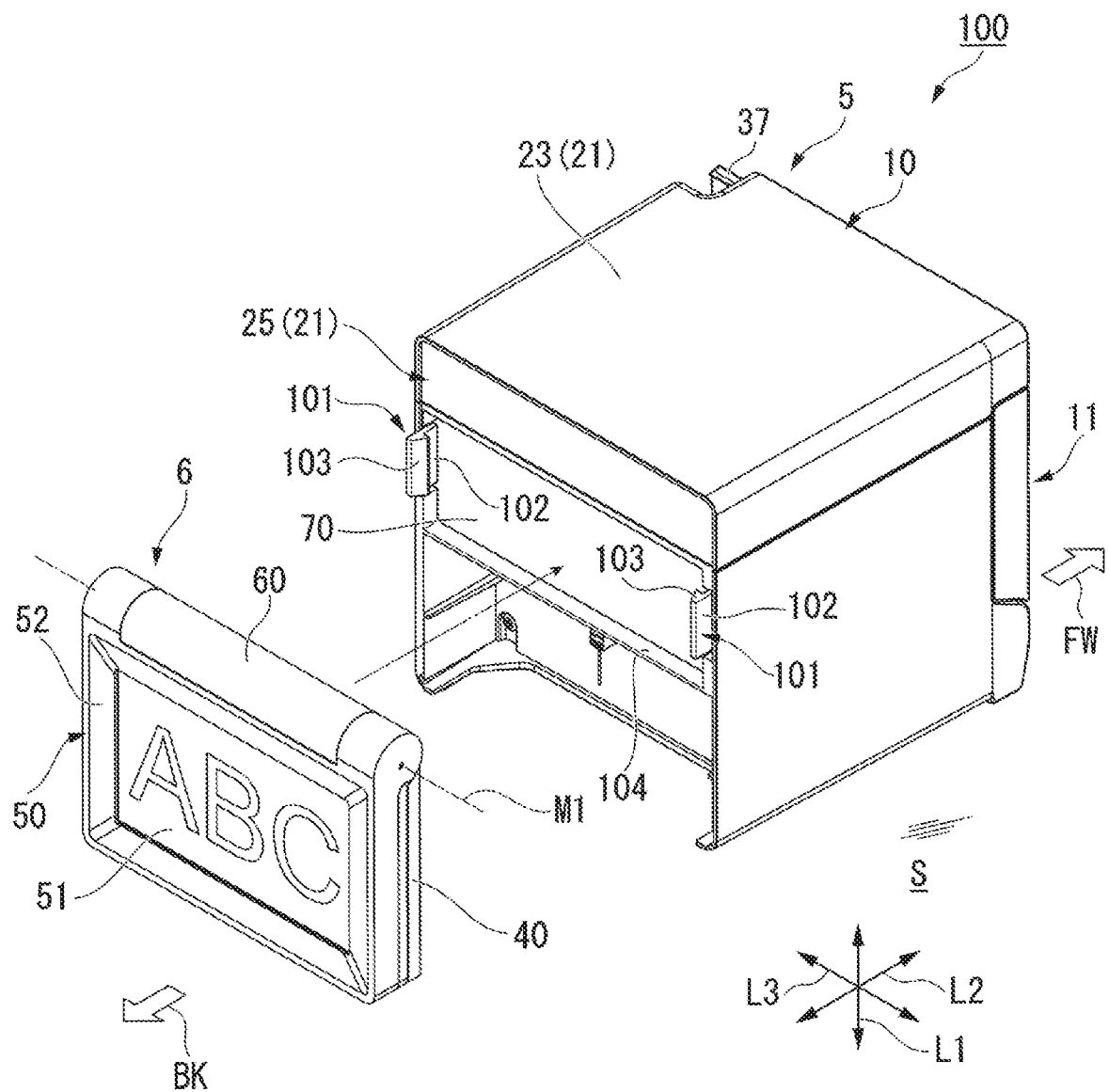
FIG. 29 is a perspective view of a modification example of the thermal printer according to the present invention in a state in which the printer display device is removed.

For example, as illustrated in FIG. 29, a pair of holding portions 101 arranged at an interval in the right-and-left direction L3 may be formed on the mounting surface 70 instead of the screw holes 73. The holding portions 101 each include a holding piece 102 that extends along the up-and-down direction L1 and protrudes to the back side and a locking protrusion 103 formed at a distal end of the holding piece 102, and can be elastically deformed in the right-and-left direction L3. The pair of holding portions 101 can hold the fixing portion 40 of the printer display device 6 so as to sandwich the fixing portion 40 from the right-and-left direction L3 through use of an elastic force.

Even in the case of the thermal printer 100 having the configuration described above, the printer display device 6 can be separably mounted to the mounting surface 70, and hence the same action and effect as those in each of the embodiments can be exhibited. In this case, it is preferred that a step 104 configured to support a lower end part of the fixing portion 40 from below be formed on the mounting surface 70.

Figure 30:
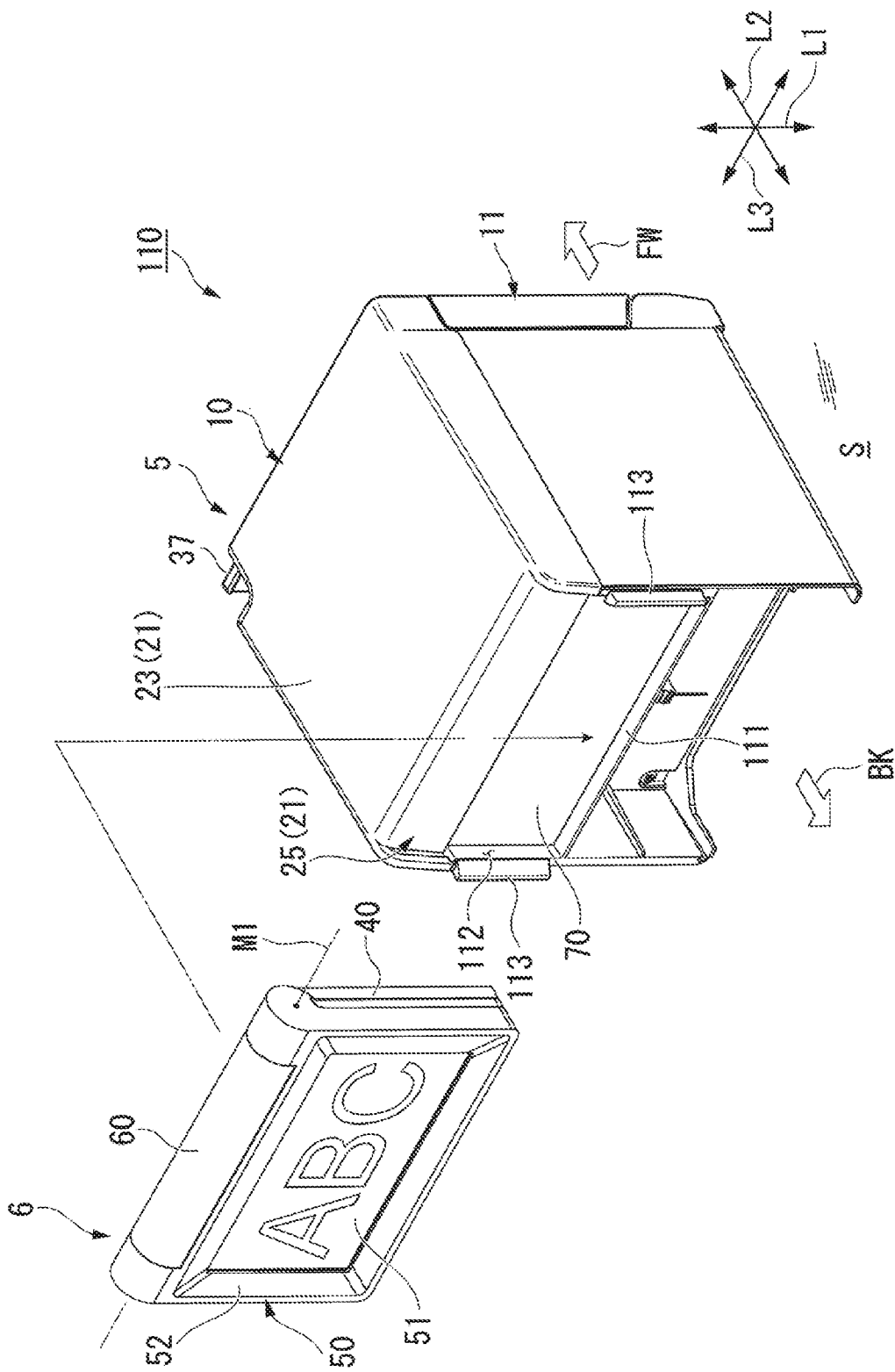
FIG. 30 is a perspective view of another modification example of the thermal printer according to the present invention in a state in which the printer display device is removed.

Further, as illustrated in FIG. 30, a step 111 configured to support the lower end part of the fixing portion 40 from below may be formed on the mounting surface 70, and a pair of guide pieces 113, which are each configured to define a slide groove 112 for allowing the fixing portion 40 to be slid and inserted from above between the guide piece 113 and the mounting surface 70, may be formed so as to extend in the up-and-down direction L1. Even in the case of a thermal printer 110 having the configuration described above, the printer display device 6 can be separably mounted to the mounting surface 70, and hence the same action and effect as those in each of the embodiments can be exhibited.

What is claimed is:

1. A printer, comprising:
   a printer housing, which includes a plurality of outer surfaces including a bottom surface opposed to an installation surface, and has a recording paper receiving portion configured to receive recording paper through an opening portion;
   a printer cover, which is coupled to the printer housing, and is configured to openably cover the opening portion;
   a printer display device, which is removably mounted to the outer surface, of the plurality of outer surfaces, other than the bottom surface, and is configured to display predetermined information; and
   a connection cable, which is connected between the printer housing and the printer display device, and is configured to communicate at least data related to the predetermined information,
   the printer display device including:
   a fixing portion separably mounted to the outer surface;
   a display portion main body having a display portion configured to display the predetermined information provided thereon; and
   a hinge portion configured to couple the fixing portion and the display portion main body to each other so that the display portion main body is displaced relative to the fixing portion.

2. The printer according to claim 1,
   wherein the printer housing includes, as the plurality of outer surfaces, at least a front surface and a back surface opposed to each other,
   wherein the printer cover is provided on the front surface, and
   wherein the printer display device is separably mounted to the back surface.

3. The printer according to claim 2,
   wherein the hinge portion has a rotation axis extending in parallel to each of the installation surface and the outer surface to which the printer display device is mounted, and
   wherein the display portion main body is coupled to the fixing portion so as to be rotated about the rotation axis through intermediation of the hinge portion.

4. The printer according to claim 3,
   wherein the printer housing further includes, as the plurality of outer surfaces, a top surface opposed to the bottom surface, and
   wherein the display portion main body is configured to be displaced by rotation about the rotation axis between a first position at which the display portion main body is overlapped with the fixing portion and a second position at which the display portion is positioned above the top surface.

5. The printer according to claim 4,
   wherein the display portion main body is configured to be rotated within a rotation angle range of 180° about the rotation axis from the first position, and
   wherein the second position is set to be a position at which the display portion main body is rotated by 135° or more about the rotation axis from the first position.

6. The printer according to claim 5, wherein the fixing portion includes:
   a first base portion separably mounted to the outer surface;
   a second base portion having the display portion main body coupled thereto through intermediation of the hinge portion; and
   a coupling member configured to couple the first base portion and the second base portion to each other so that the second base portion is displaced relative to the first base portion through intermediation of at least one auxiliary hinge portion.

7. The printer according to claim 1,
   wherein the hinge portion has a rotation axis extending in parallel to each of the installation surface and the outer surface to which the printer display device is mounted, and
   wherein the display portion main body is coupled to the fixing portion so as to be rotated about the rotation axis through intermediation of the hinge portion.

8. The printer according to claim 7,
   wherein the printer housing further includes, as the plurality of outer surfaces, a top surface opposed to the bottom surface, and
   wherein the display portion main body is configured to be displaced by rotation about the rotation axis between a first position at which the display portion main body is overlapped with the fixing portion and a second position at which the display portion is positioned above the top surface.

9. The printer according to claim 8,
   wherein the display portion main body is configured to be rotated within a rotation angle range of 180° about the rotation axis from the first position, and
   wherein the second position is set to be a position at which the display portion main body is rotated by 135° or more about the rotation axis from the first position.

10. The printer according to claim 1, wherein the fixing portion includes:
    a first base portion separably mounted to the outer surface;
    a second base portion having the display portion main body coupled thereto through intermediation of the hinge portion; and
    a coupling member configured to couple the first base portion and the second base portion to each other so that the second base portion is displaced relative to the first base portion through intermediation of at least one auxiliary hinge portion.

11. A printer display device, which is separably mounted to a printer, and has at least data related to predetermined information communicated thereto through a connection cable connected between a printer housing and the printer display device,
    the printer including:
    the printer housing, which includes a plurality of outer surfaces including a bottom surface opposed to an installation surface, and has a recording paper receiving portion configured to receive recording paper through an opening portion; and
    a printer cover, which is coupled to the printer housing, and is configured to openably cover the opening portion,
    the printer display device comprising:
    a fixing portion separably mounted to the outer surface, of the plurality of outer surfaces, other than the bottom surface;
    a display portion main body having a display portion configured to display the predetermined information provided thereon; and
    a hinge portion configured to couple the fixing portion and the display portion main body to each other so that the display portion main body is displaced relative to the fixing portion.

* * * * *